United States Patent [19]

Arimoto

[11] Patent Number: 5,481,365
[45] Date of Patent: Jan. 2, 1996

[54] IMAGE RECORDING APPARATUS HAVING A MEMORY FOR STORING IMAGES

[75] Inventor: Shinobu Arimoto, Yokohama, Japan

[73] Assignee: Canon Kabushiki Kaisha, Tokyo, Japan

[21] Appl. No.: 16,105

[22] Filed: Feb. 10, 1993

[30] Foreign Application Priority Data

Feb. 13, 1992 [JP] Japan ..................... 4-026827

[51] Int. Cl.$^6$ ................ H04N 1/21; H04N 1/23; H04N 1/46
[52] U.S. Cl. ............ 358/296; 358/300; 358/444; 358/449; 358/501
[58] Field of Search .............. 358/296, 300, 358/444, 449, 501, 505, 524, 530, 538; 355/327; 395/115, 116

[56] References Cited

U.S. PATENT DOCUMENTS

| | | | |
|---|---|---|---|
| 4,439,790 | 3/1984 | Yoshida | 358/296 |
| 4,878,110 | 10/1989 | Maruyama et al. | 358/75 |
| 5,001,574 | 3/1991 | Shimizu et al. | 358/449 X |
| 5,189,523 | 2/1993 | Sugiura et al. | 358/300 |
| 5,260,804 | 11/1993 | Fukutani et al. | 358/444 |
| 5,327,261 | 7/1994 | Hirota et al. | 358/449 |

Primary Examiner—Peter S. Wong
Assistant Examiner—Eric Frahm
Attorney, Agent, or Firm—Fitzpatrick, Cella, Harper & Scinto

[57] ABSTRACT

An image recording apparatus which includes reading means for reading an original image and for outputting an image signal corresponding to the original image, storage means for storing the image signal output from the reading means, and image forming means for forming an image on a recording medium based on one of the image signal output from the reading means and the image signal stored in the storage means. A transfer medium holding member holds a first transfer medium and a second transfer medium to transfer images formed on the recording medium onto the first transfer medium and the second transfer medium. Control means controls the reading means and the storage means so that an image to be transferred onto the first transfer medium held on the transfer medium holding member is formed based on the image signal output from the reading means, and an image to be transferred onto the second transfer medium held on the transfer medium holding member is formed based on the image signal stored in the storage means.

15 Claims, 14 Drawing Sheets

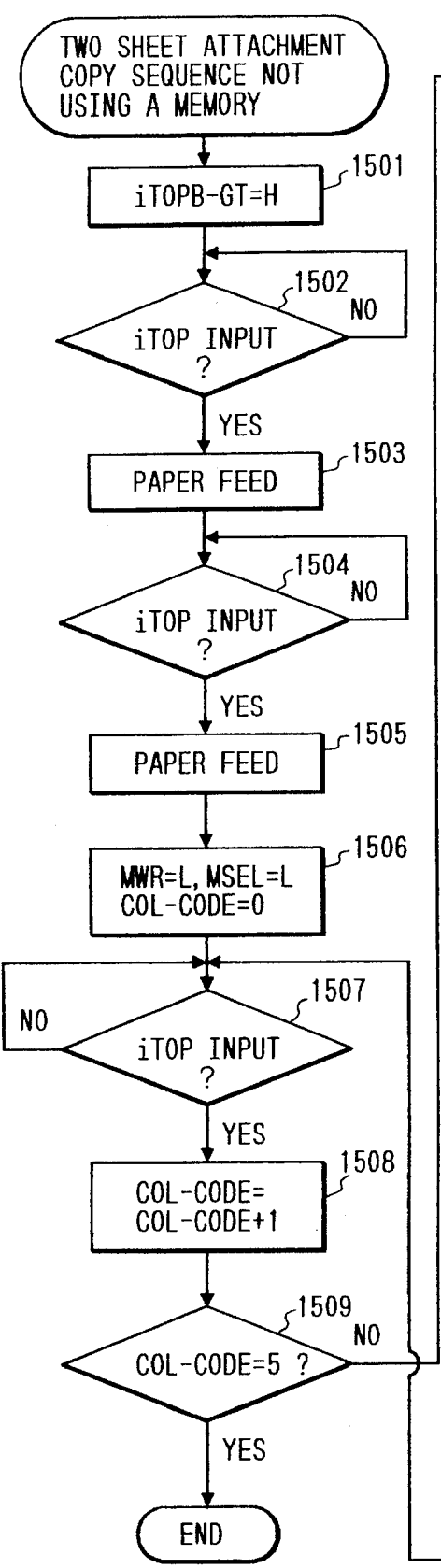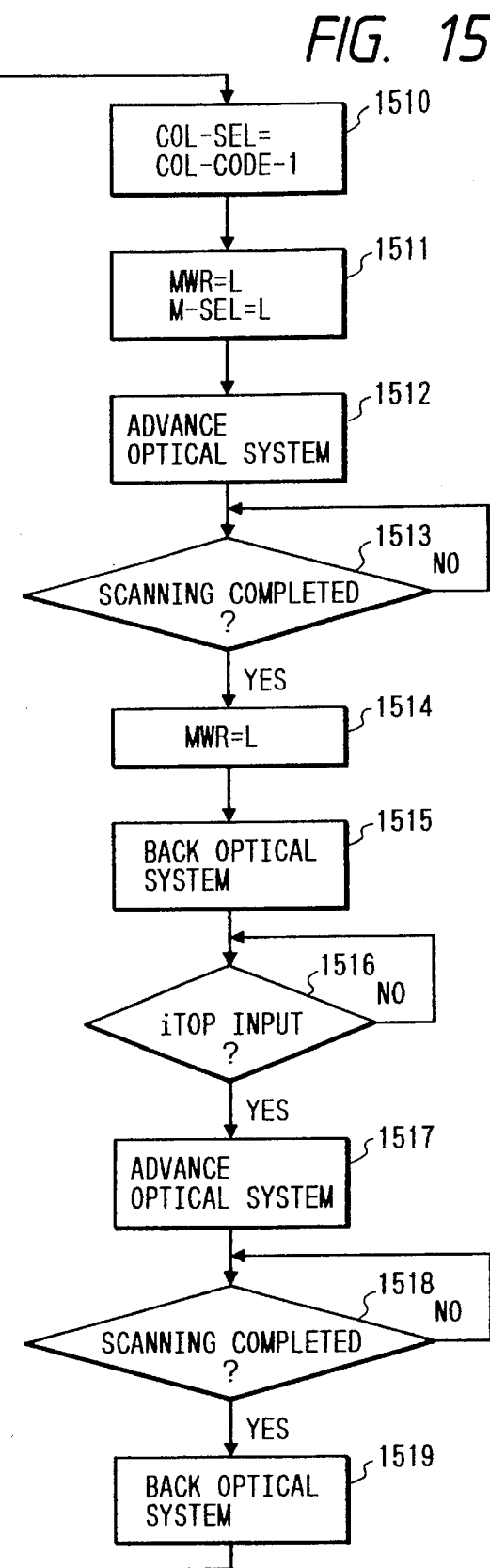
FIG. 15

IMAGE RECORDING APPARATUS HAVING A MEMORY FOR STORING IMAGES

BACKGROUND OF THE INVENTION

1. Field of the Invention

The present invention relates to an image forming apparatus, which can in form a plurality of identical images in parallel.

2. Description of the Related Art

As an image recording apparatus, a copying machine, an LBP, and the like are popularly used. Recently, a color copying machine for reproducing a full-color original image in full color is proposed as well.

Such a color copying machine has an image transfer member such as a transfer drum, and normally forms a color image by sequentially overlaying magenta, cyan, yellow, and black color-separated images on a recording sheet held on the transfer member.

Upon formation of a plurality of images in such a color image recording apparatus, an arrangement for attaching a plurality of recording sheets onto a transfer drum, and recording identical color images on the attached recording sheets is proposed (U.S. patent application Ser. No. 437,033, and the like). For example, when two recording sheets are attached to the transfer drum, an optical system is driven twice to record two magenta images, and thereafter, the optical system is driven twice each for cyan, yellow, and black recording colors, thereby forming two each color images.

More specifically, since the optical system performs a read scanning operation in units of recording sheets attached to the transfer drum, the optical system must be returned to the read scanning start position in the interval between the trailing end of a recording sheet and the leading end of the next recording sheet on the transfer drum.

In the above-mentioned apparatus, when a plurality of recording sheets are attached to the transfer drum, and the optical system is to be returned to a home position in the interval between the adjacent recording sheets, the return speed becomes higher than that in an original reading mode.

As a result, when image formation is to be performed at higher speed, the reading optical system cannot be returned in the interval between the adjacent recording sheets due to a mechanical limitation on the driving speed.

When given image formation efficiency is to be maintained while returning the optical system at relatively high speed, the return time of the optical system must be assured by increasing the interval between recording sheets. As a result, the diameter of the transfer drum must be increased, and the apparatus size becomes large. Even if the high-speed image formation is attained in this manner, since the time required for completing one revolution of the transfer drum is increased due to an increase in diameter of the transfer drum, the copy speed cannot be so increased.

SUMMARY OF THE INVENTION

It is an object of the present invention to provide an image recording apparatus, which can eliminate the above-mentioned drawbacks.

It is another object of the present invention to provide an image recording apparatus, which can efficiently form a plurality of identical images according to the size of a recording sheet.

It is still another object of the present invention to provide an image recording apparatus, which can efficiently record images by selectively using an image recording mode synchronous with an original scanning operation, and an image recording mode synchronous with read processing of an image from a memory in accordance with the original size.

It is still another object of the present invention to provide an image recording apparatus, which can decrease the image memory capacity as much as possible when a plurality of identical images are recorded efficiently.

Other objects of the present invention will become apparent from the following description taken in conjunction with the accompanying drawings, and appended claims.

BRIEF DESCRIPTION OF THE DRAWINGS

FIG. 15 shows a control flow of two-sheet attachment copy sequence using no memory in the embodiment shown in FIG. 14.

DETAILED DESCRIPTION OF THE PREFERRED EMBODIMENTS

The preferred embodiments of the present invention will be described hereinafter.

[First Embodiment]

Figure 2:
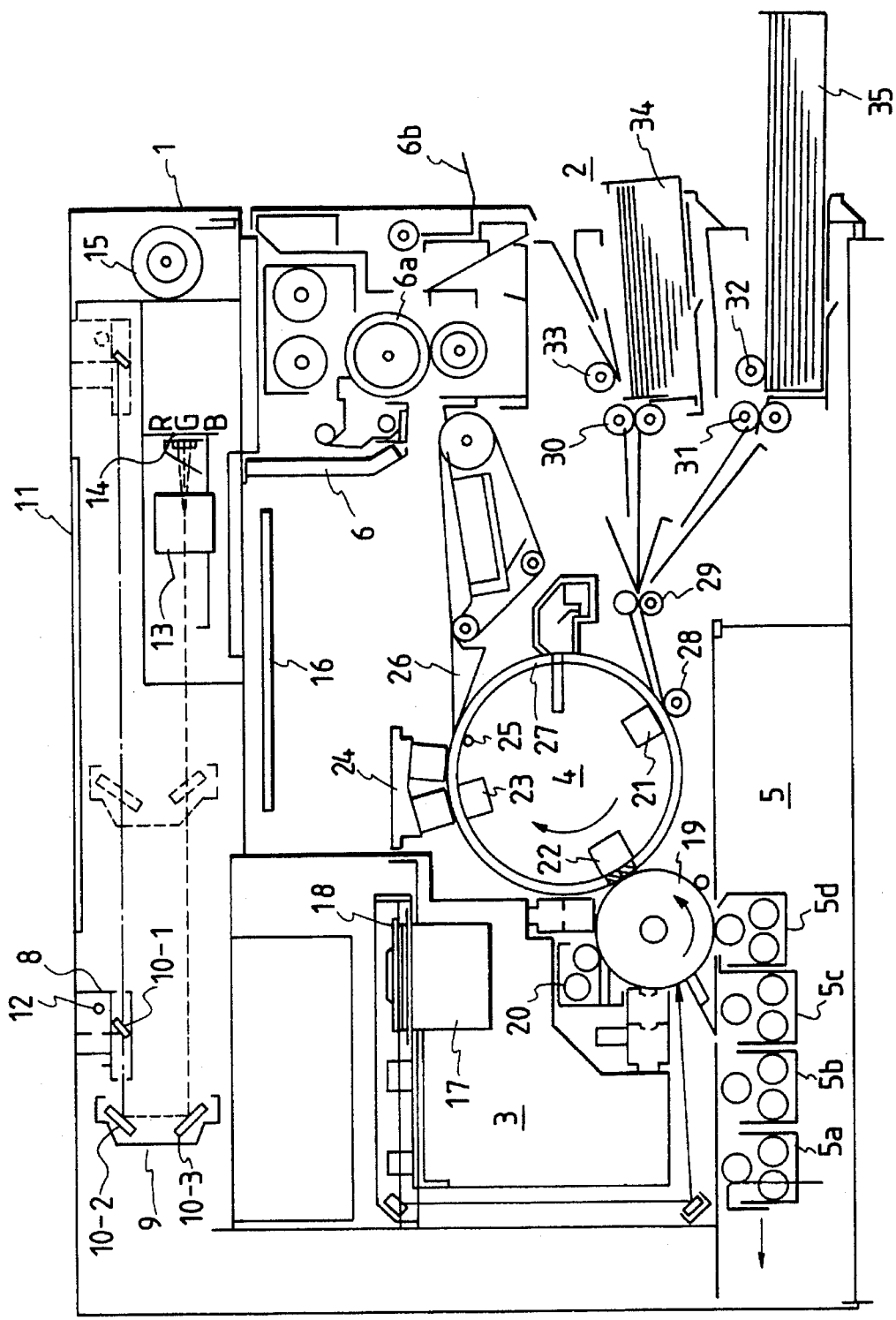
FIG. 2 is a sectional view of a color copying machine, which adopts the present invention.

FIG. 2 shows a full-color electrophotography copying machine according to the present invention.

In FIG. 2, a reader section 1 is constituted by mirrors 10-1 to 10-3, an original table (platen glass) 11, an original illumination lamp 12, a focusing lens 13, an image pickup element 14, an optical system driving motor 15, and the like.

The image pickup element 14 comprises three lines of CCD image sensors, which are arranged adjacent to each other, and are respectively provided with R (red), G (green), and B (blue) filters.

Light information for a single line from an original is projected onto the R, G, and B line sensors.

A known original scanning unit 8, which is scanned together with the original illumination lamp 12 and the mirror 10-1, is moved by the optical system driving motor 15 at a predetermined speed determined according to a selected copying magnification, thereby sequentially reading a color original on the original table 11. In this embodiment, since recording operations using magenta, cyan, yellow, and black developing colors are sequentially performed, an original reading operation is performed a plurality of number of times in correspondence with the recording operations of the developing colors.

An operation unit is arranged around the original table (platen glass) 11, and is provided with switches for setting various modes associated with copy sequences, a display, and indicators.

A recording sheet feeding section 2 is constituted by paper feed rollers 30 and 31, pickup rollers 32 and 33, and the like, and feeds a recording sheet stored in a loaded paper cassette 34 or 35 according to a driving command from a controller unit 16.

An image forming section 3 is constituted by a scanner motor 17, a polygonal mirror 18, a photosensitive drum 19, and a cleaner unit 20. Color image signals read by the CCD 14 are processed by the controller unit 16 to generate magenta, cyan, yellow, and black color-separated image signals. A laser beam emitted from a laser light source is focused on the photosensitive drum 19 on the basis of each color signal, thereby forming an electrostatic latent image of each color in units of lines.

An image transfer section 4 is constituted by a chucking charger 21, a transfer charger 22, peeling chargers 23 and 24, a peeling pressing roller 25, a peeling pawl 26, a transfer drum 27, a chucking roller 28, a registration roller 29. A recording sheet 63 fed to the position of the registration roller 29 by the paper feed rollers 30 or 31 is fed by the registration roller 29 to the transfer drum 27 at a timing synchronized with the image leading end position of the photosensitive drum 19. The recording sheet 63 is electrostatically attracted on the transfer drum 27 by the chucking roller 28 and the chucking charger 21, which serve as counter electrodes.

The transfer charger 22 transfers each color developing agent (toner) image developed on the photosensitive drum 19 onto the recording sheet 63.

A developing section 5 is constituted by developing devices 5a to 5d. The developing section 5 is reciprocally moved by a motor (to be described later) in the directions of arrows, thereby moving a developing sleeve to the developing position of the photosensitive drum. The developing devices 5a to 5d respectively store black, yellow, cyan, and magenta toners in the order named.

An electrostatic latent image formed on the photosensitive drum 19 is visualized by predetermined toners by the developing devices 5a to 5d. First, a magenta electrostatic latent image on the photosensitive drum 19 is developed using the magenta developing device 5d, and the developed magenta toner image is transferred onto the recording sheet 63 attracted on the transfer drum 27. Then, a cyan electrostatic latent image on the photosensitive drum 19 is developed using the cyan developing device 5c, and the developed cyan toner image is transferred onto the recording sheet 63 attracted on the transfer drum 27. Similarly, toner images developed by the yellow and black developing devices are sequentially transferred onto the recording sheet 63 to overlap each other.

A fixing section 6 fixes black, yellow, cyan, and magenta toner images onto the recording sheet 63 by a fixing roller 6a, and then delivers the sheet onto a tray 6b.

Figure 1:
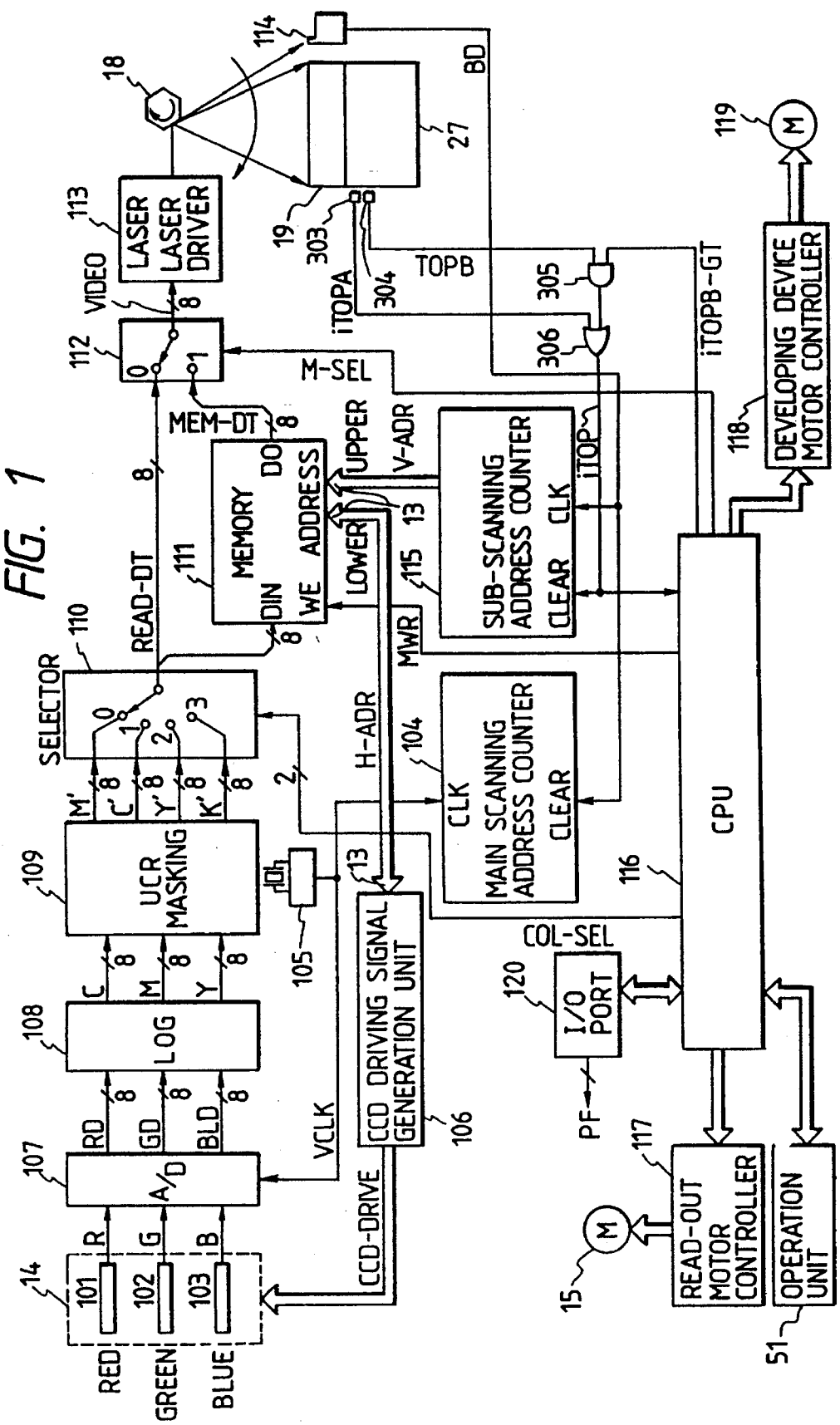
FIG. 1 is a block diagram showing a controller unit according to the first embodiment of the present invention.

FIG. 1 shows the controller unit 16 and peripheral units to be controlled by the controller unit 16.

The image pickup element (CCD) 14 is constituted by three lines of CCDs respectively comprising red, green, and blue color-separation filters 101, 102, and 103. The CCD 14 reads and color-separates light information for one line from an original at a resolution of 400 dpi, and outputs R (red), G (green), and B (blue) electrical signals (image signals). In this embodiment, since the width of one line to be read is a maximum 297 mm (A4 size), the CCD 14 outputs R, G, and B image signals each corresponding to an image of 4,677 pixels for one line.

A main scanning address counter 104 is cleared in units of lines by a BD signal as a recording sync signal for each line. The counter 104 counts VCLK signals from a pixel clock generator 105, and generates a count output H-ADR corresponding to each pixel of an image signal for one line read from the CCD 14. Since the count H-ADR is incremented from 0 to 5,000, an image signal for one line can be sufficiently read from the CCD 14.

A CCD driving signal generation unit 106 decodes the count H-ADR to generate shift pulses, reset pulses, and CCD-DRIVE signals as transfer clocks for the CCD 14. Thus, R, G, and B color-separated image signals corresponding to one pixel are sequentially output from the CCD 14 in synchronism with the VCLK signal.

An A/D converter 107 converts R, G, and B image signals into 8-bit digital signals. A light amount-density converter 108 converts R, G, and B 8-bit light amount signals into cyan (C), magenta (M), and yellow (Y) 8-bit density signals by log conversion. A UCR/masking processor 109 extracts a black density signal from the C, M, and Y density signals by known UCR (undercolor removal) processing, and executes a known masking calculation of the density signals so as to remove color fogging of corresponding toners. A selector 110 selects a color image signal corresponding to a currently used toner from M', C', Y', and K' (black) density signals generated as described above. A COL-SEL signal is a 2-bit signal, which is generated by a CPU 116 to achieve this color selection. When the COL-SEL signal is 0, the M' signal is output as a READ-DT signal; when COL-SEL=1, the C' signal is output; when COL-SEL=2, the Y' signal is output; and when COL-SEL=3, the K' signal is output.

A page memory 111 stores image data, and has a capacity for one A4-size color. As an address of this memory 11, the pixel identification count output H-ADR from the main scanning address counter 104 is supplied as a lower address portion, and a line count output V-ADR from a sub-scanning address counter 115 is supplied as an upper address portion.

The sub-scanning address counter 115 is initialized by page start signals ITOPA and ITOPB from photosensors 303 and 304 (to be described later) arranged near the transfer drum 27, and generates a line count output in one page.

In this manner, the address data of the memory 111 is generated in synchronism with image reading and recording operations in units of pages.

The switching operation between read and write modes of the memory 111 is performed in response to a port output signal MWR from a CPU 116. When the signal MWR is at H level, the memory 111 is set in the write mode; when it is at L level, the memory 111 is set in the read mode.

A selector 112 selects one of image data READ-DT obtained by processing image signals read by the CCD 14 in real time and data MEM-DT read out from the memory 111, and outputs a VIDEO signal. A laser & laser-driver 113 controls (modulates) the light emission amount of the laser according to the VIDEO signal as an 8-bit density signal. The modulated laser beam is scanned by the polygonal mirror 18 in the axial direction of the photosensitive drum 19, and forms an electrostatic latent image on the photosensitive drum in units of lines.

A photodetector 114 is arranged in the vicinity of the photosensitive drum 19, and generates the 1-line sync signal BD upon detection of passage of the laser beam immediately before the laser beam scans the photosensitive drum 19. The main scanning address counter 104 is initialized (cleared) by the BD signal. The sub-scanning address counter 115 counts the BD signals, and generates an upper address V-ADR of the memory 111.

When the transfer drum 27 reaches corresponding predetermined positions, the photosensors 303 and 304 detect it and generate the page sync signals ITOPA and ITOPB, respectively. An AND gate 305 selectively allows the ITOPB signal to pass therethrough. The output from an OR gate 306 initializes the sub-scanning address counter 115, and is also input to the CPU 116.

The CPU 116 controls image reading and recording operations. A controller 117 controls the advancing/backing operations and speed of the read-out (optical system driving) motor 15. A controller 118 controls a developing device motor 119 to move the developing devices 5a to 5d and to locate a predetermined developing device at the developing position of the photosensitive drum 19. An I/O port 120 controls other sensors and actuators necessary for controlling a copy operation. The I/O port 120 includes a PF signal for feeding a recording sheet from the cassette 34 or 35.

Figure 4:
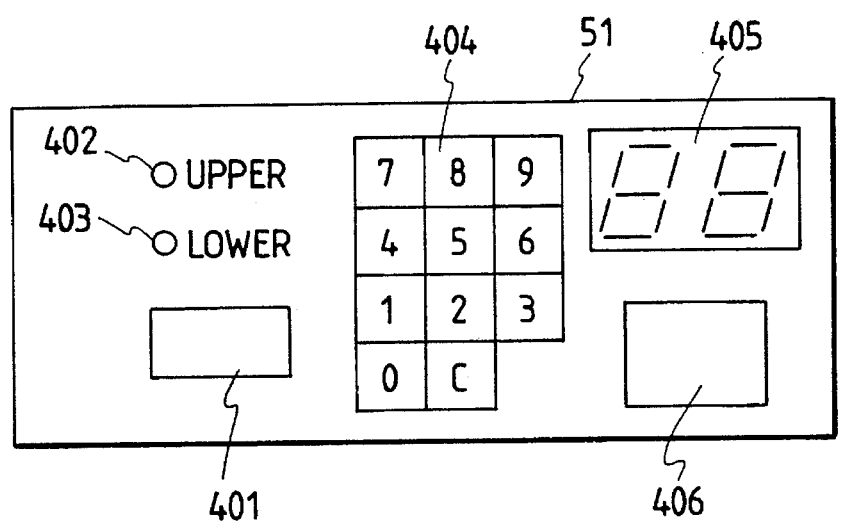
FIG. 4 is a plan view showing an operation unit of the color copying machine, which adopts the present invention.

An operation unit 51 has keys, indicators, and a display, as shown in detail in FIG. 4.

More specifically, the operation unit 51 has a key 401 for selecting a paper feed stage, an LED indicator 402 for indicating that the upper cassette 34 is selected, an LED indicator 403 for indicating that the lower cassette 35 is selected, a ten-key pad 404 for inputting a copy count and including a clear key for clearing an input count, an input count display 405 comprising two digits of 7-segment LEDs, and a copy start key 406.

Figure 3:
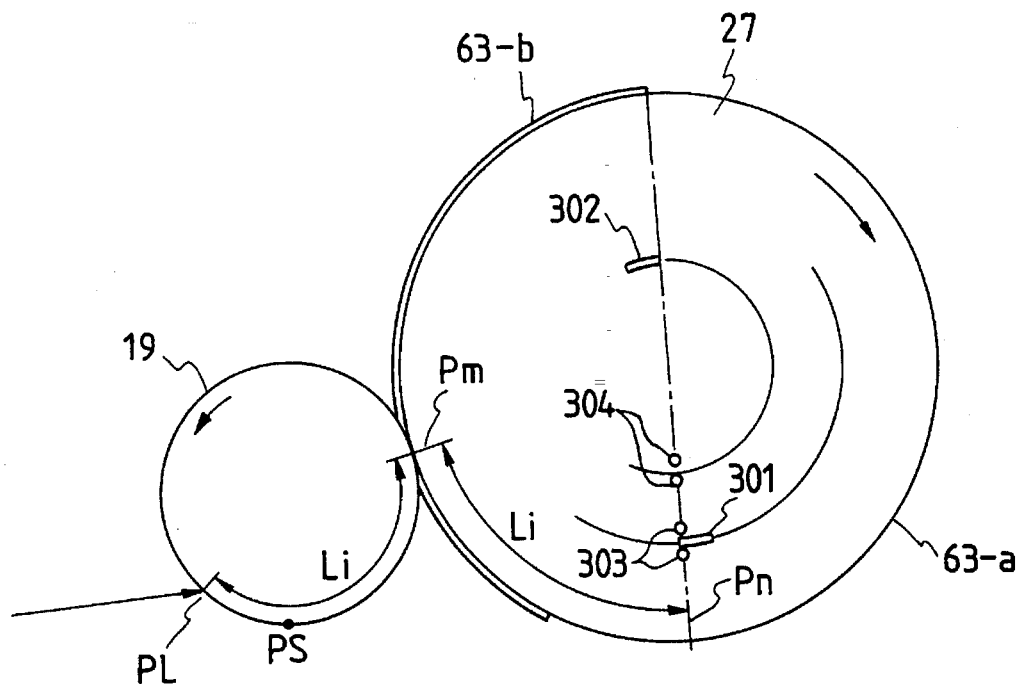
FIG. 3 is a sectional view showing the details of a transfer drum in the first embodiment.

FIG. 3 shows the details of the photosensitive drum 19 and the transfer drum 27.

The transfer drum 27 has a diameter of 160 mm and a circumference of 502.6 mm. As for a recording sheet having a large size such as an A3 size, a B4 size, a ledger size, or the like, one sheet is attached onto the transfer drum 27 since the length, in the circumferential direction of the transfer drum, of such a recording sheet is longer than half the circumference of the transfer drum 27. As for a recording sheet having a small size such as an A4 size, a letter size, or the like, which sheet has a smaller length in the circumferential direction of the transfer drum than half the circumference of the transfer drum, a plurality of sheets can be attached onto the transfer drum 27. FIG. 3 shows a state wherein two A4-size sheets are attached onto the transfer drum 27.

Flags 301 and 302 are mounted on the transfer drum, and are rotated together with the transfer drum. The photosensors 303 and 304 are fixed to the apparatus side. As shown in FIG. 3, the photosensors 303 and 304 detect passage of the flags 301 and 302, respectively.

In the circumferential direction of the photosensitive drum 19, an electrostatic latent image formed by a laser beam at a position PL is developed by a toner at a position Ps. The toner image is transferred to a recording sheet attached to the transfer drum 27 at a contact position Pm between the transfer drum 27 and the photosensitive drum 19. Note that the distance between the latent image forming position PL and the transfer position Pm is Li. A recording sheet 63-a is attached to the transfer drum 27, so that the flag 301 reaches the position of the photosensor 303 when the leading end of the sheet has reached a position the distance Li before the transfer position Pm. Similarly, a recording sheet 63-b is attached to the transfer drum 27, so that the flag 302 reaches the position of the photosensor 304 when the leading end of the sheet has reached a position the distance Li before the transfer position Pm. Therefore, when the photosensor 303 or 304 detects passage of the flag 301 or 302, formation of a latent image on the photosensitive drum 19 is started, so that the leading end of the image is aligned with that of the recording sheet.

On the other hand, when a recording sheet has a large size such as an A3 size, a B4 size, a ledger size, or the like, only one recording sheet is attached onto the transfer drum 27. In this case, the leading end of the recording sheet is attached at the same position as that of the recording sheet 63-a shown in FIG. 3. More specifically, in the case of a large-size recording sheet, the output from the photosensor 303 is used as the sync signal for the leading end of an image.

Image formation control will be described below with reference to timing charts and flow charts.

Figure 5:
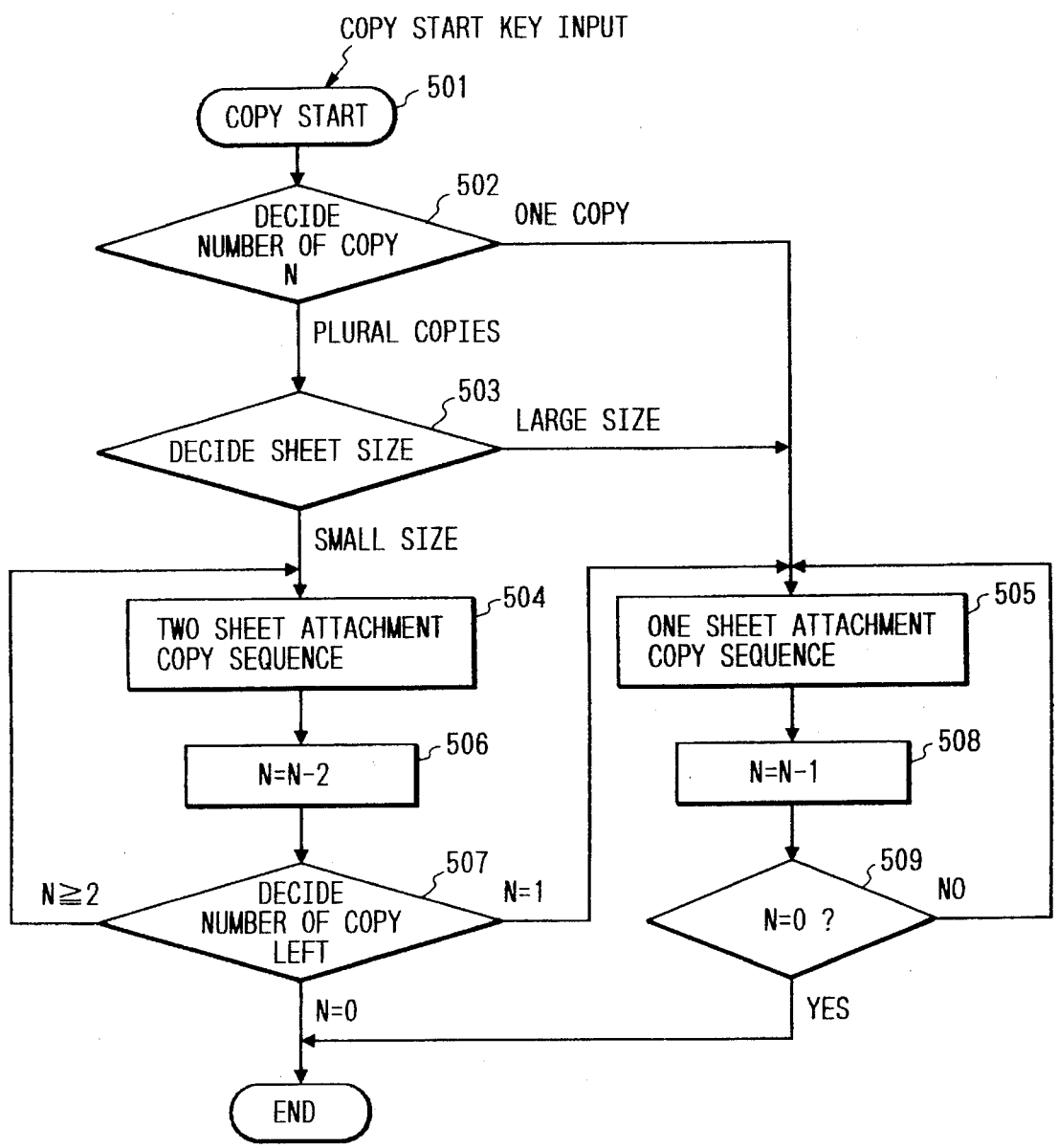
FIG. 5 is a flow chart showing a control flow of the first embodiment.

FIG. 5 is a control flow chart of a copy operation of the CPU 116. When the copy start key 406 on the operation unit 51 is depressed by an operator in step 501, the number N of copies input using the ten-key pad on the operation unit 51 is checked in step 502. If it is determined in step 502 that the number N of copies is 2 or more, a sheet size to be used is checked in step 503.

If it is determined in steps 502 and 503 that the number of copies is 2 or more, and a small size is selected as the sheet size, a two-sheet attachment copy sequence is executed in step 504. In this case, the small size means a sheet size such as an A4 size, a letter size, or the like, which allows two sheets to be simultaneously attached onto the transfer drum 27.

However, if it is determined in step 502 or 503 that the sheet size is a large size such as an A3 size, a B4 size, a ledger size, or the like, and only one recording sheet is wound on the transfer drum 27, or that the number of copies is 1 although a small size is selected, a one-sheet attachment copy sequence is executed in step 505.

In the two-sheet attachment copy sequence, since two copies are formed during one revolution of the transfer drum 27, the number N of copies is decremented by "2" in step 506, and the remaining number of copies is checked in step 507. If the remaining number N of copies is 2 or more, the two-sheet attachment copy sequence is executed in step 504 again. If the remaining number N of copies is 1, the remaining one copy is formed by the one-sheet attachment copy sequence in step 505. If N=0, all the copy operations are ended.

If the one-sheet attachment copy sequence is executed in step 505, the number N of copies is decremented by "1" in step 508, and the remaining number of copies is checked in step 509. If N=0, the copy operation is ended; otherwise, the one-sheet attachment copy sequence is executed in step 505 again.

(Two-sheet Attachment Copy Sequence)

Figure 6:
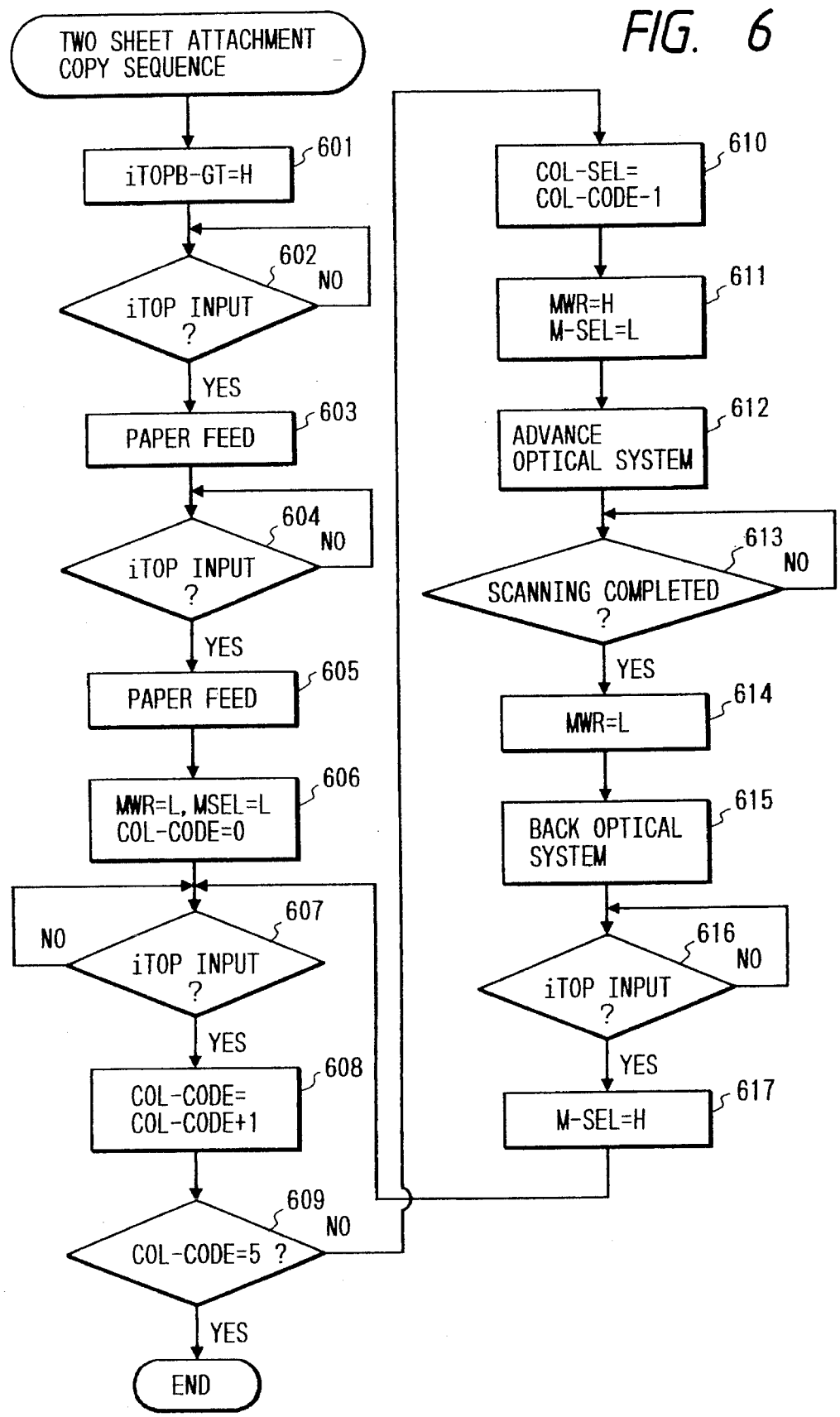
FIG. 6 is a control flow chart of a two-sheet attachment copy sequence of the first embodiment.

FIG. 6 is a control flow chart of the two-sheet attachment copy sequence executed by the CPU 116.

In step 601, the CPU 116 sets an ITOPB-GT signal at H level. Thus, ITOPA and ITOPB signals generated for every half revolutions of the transfer drum 27 are logically ORed by an OR gate 306, and the OR signal is input as an ITOP signal to the CPU 116. The CPU 116 performs two-sheet attachment control for the transfer drum 27 and image output control for the two sheets in response to the ITOP signals generated for every half revolutions of the transfer drum 27.

Upon detection of the input ITOP signal in step 602, the CPU 116 drives the pickup roller (32 or 33) and the paper feed rollers (30 or 31) of the selected paper feed cassette, and the registration roller 29 using a PF signal output from the I/O port 120, thereby attaching the first recording sheet onto the transfer drum 27 in step 603. Upon detection of the next ITOP signal in step 604, the CPU 116 attaches the second recording sheet onto the transfer drum 27 in step 605.

In this manner, the two recording sheets are attached onto the transfer drum 27, as shown in FIG. 3.

In step 606, the CPU 116 sets MWR and M-SEL signals at L level, and stores "0" in a COL-CODE register allocated on its internal memory (not shown).

In step 607, the CPU 116 waits for an ITOP signal so as to identify an image recording start timing for the first recording sheet attached to the transfer drum 27. When the ITOP signal is input, the CPU 116 increments the content of the COL-CODE register by 1 in step 608. The content of the COL-CODE register represents a recording color (1 corresponds to magenta (M); 2, cyan (C); 3, yellow (Y); and 4, black (K)).

In step S609, the CPU 116 checks the content of the COL-CODE register to decide if recording operations of four colors are completed. If the content of the COL-register is one of 1 to 4, since the recording operations of four colors are not completed yet, image recording is performed in step 610 and subsequent steps.

In step 610, the CPU 116 outputs, as a COL-SEL signal, a value smaller by 1 than the content of the COL-CODE register so as to cause the selector 110 to select a predetermined color signal. In step 611, the CPU 116 sets the MWR signal at H level to store an image signal READ-DT read by the CCD 14 in the memory 111, and sets the M-SEL signal at L level to perform image recording of the first sheet on the basis of the signal READ-DT.

After the above-mentioned preparation, the CPU 116 causes the read-out motor controller 117 to drive the motor 15 so as to move the optical system (the original scanning unit 8 and a mirror unit 9) forward, performs image recording on the first sheet on the basis of the image signal READ-DT read by the CCD 14, and stores the image signal READ-DT in the memory 111 in step 612. The CPU 116 waits for completion of an original scanning operation by a distance corresponding to the sheet size in step 613, and sets the MWR signal at L level to end the write access to the memory in step 614.

The CPU 116 starts an operation for returning the optical system to the original scanning start position in step 615, and waits for an ITOP signal corresponding to the second sheet in step 616. When the ITOP signal is input, the CPU 116 sets the M-SEL signal at H level in step 617 to perform image recording on the second sheet on the basis of an image signal MEM-DT obtained by reading out the image signal written in the memory 111.

Figure 7:
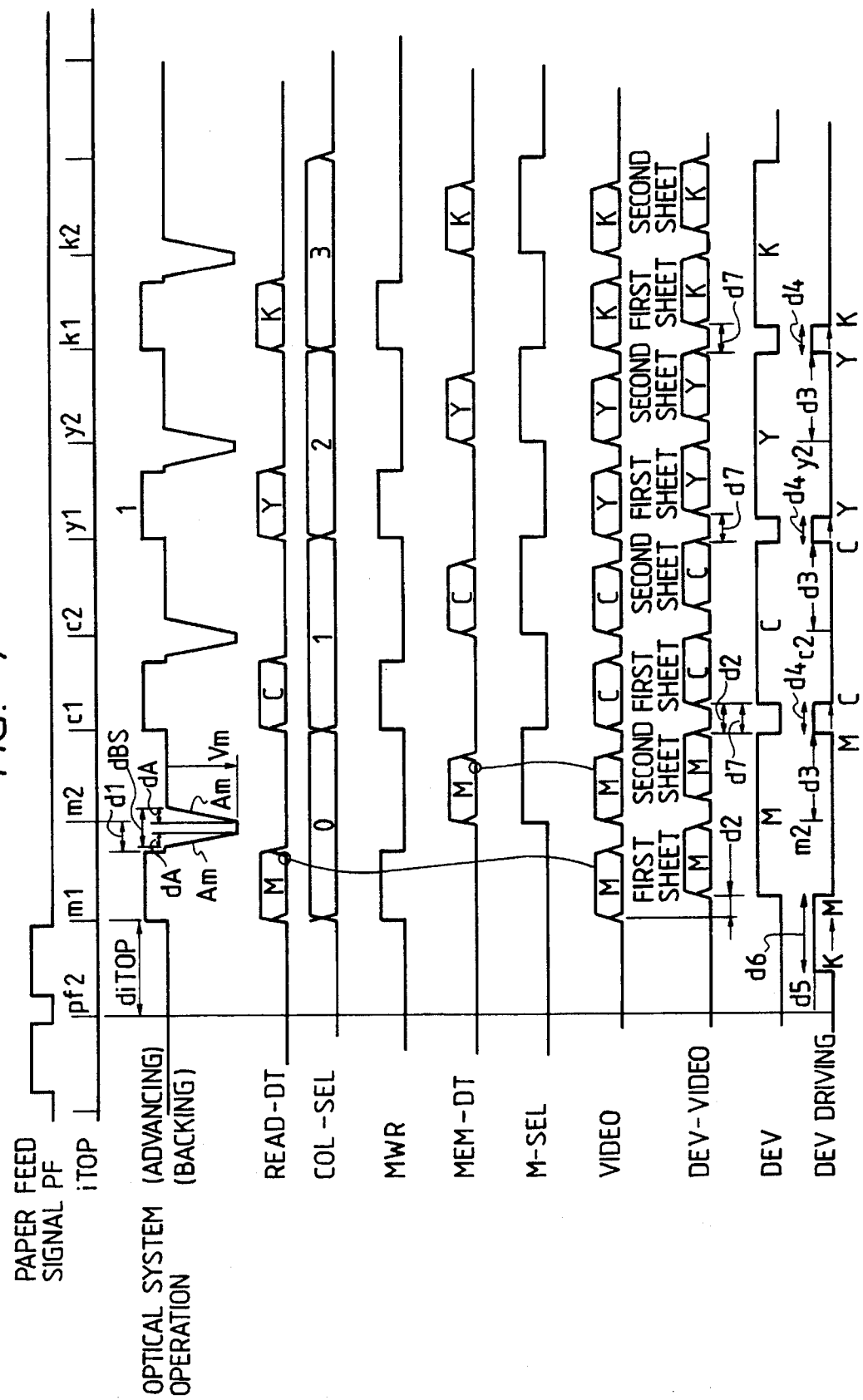
FIG. 7 is a timing chart of the two-sheet attachment copy sequence of the first embodiment.

FIG. 7 shows the operation timings of the respective units when image recording operations are simultaneously performed on two small-size sheets in the two-sheet attachment copy sequence.

As can be seen from this timing chart, when the sheet size is a small size, the image signal READ-DT is selected as an image recording signal VIDEO for the first recording sheet attached to the transfer drum 27, and is written in the memory 111 by setting the MWR signal=H. Then, the image signal used for image recording of the first sheet is read out from the memory 111 as a signal MEM-DT, and is selected as the image recording signal VIDEO to perform image recording on the second recording sheet.

A DEV-VIDEO signal in FIG. 7 indicates a timing at which an electrostatic latent image formed on the photosensitive drum 19 by the VIDEO signal reaches the developing position PS in FIG. 3. In this case, a time d2 is required until the electrostatic latent image formed at the laser beam radiation position PL in FIG. 3 reaches the developing position PS.

A DEV driving signal in FIG. 7 represents exchange control timings of the developing devices.

After an elapse of a predetermined time d5 from an ITOP signal (pf2) input before an ITOP signal (m1) for reading a magenta image is input, the CPU 116 causes the developing device motor controller 118 to drive the developing device motor 119, thereby moving the magenta developing device 5d to the developing position PS. In this case, the time required for moving the developing device 5d to the developing position in place of the black developing device 5a used at the end of the immediately preceding copy sequence is represented by d6. The CPU 116 performs moving control of the developing section 5 to have, as the above-mentioned time d5, a time obtained by subtracting the time d6 necessary for moving the developing section 5 from the sum of the time d2 required from when the ITOP signal (m1) is input until the leading end of a magenta electrostatic latent image for the first sheet reaches the developing position PS, and a time dITOP corresponding to the generation interval of the ITOP signals.

When the magenta developing device 5d is exchanged with the cyan developing device 5c, after an elapse of a time d3 from when an ITOP signal (m2) synchronized with magenta image recording for the second sheet is input, the developing device motor 119 is driven for a time d4, thereby moving the cyan developing device 5c to the developing position PS.

In this case, since the moving distance from the magenta developing device to the cyan developing device is ⅓ that from black to magenta, the time d4 required for movement also becomes ⅓ the time d6. The moving time d4 of the developing device is set to be shorter than a time d7 required from when the trailing end of an electrostatic latent image of a certain color passes the developing point PS until the leading end of an electrostatic latent image of the next color reaches, so that the developing operations free from color omissions can be achieved on the entire surface of the recording sheet.

For this purpose, after an elapse of the time d3 from input of the ITOP signal (m2), the CPU 116 moves the cyan developing device 5c to the developing position. Note that the time d3 is a time obtained by subtracting the time d4 required for moving the developing device from the sum (a time between ITOP (m2) to the beginning of development of cyan) of the ITOP interval dITOP and the time d2.

Similarly, after an elapse of the time d3 from input of a cyan ITOP signal (c2), the CPU 116 moves the yellow developing device 5b to the developing position.

Furthermore, after an elapse of the time d3 from input of a yellow ITOP signal (y2), the CPU 116 moves the black developing device 5a to the developing position.

A DEV signal in FIG. 7 represents the developing devices used in correspondence with electrostatic latent images of respective colors under the above-mentioned developing device moving control.

As described above, in the two-sheet attachment copy sequence, two small-size recording sheets are attached to the transfer drum 27, and image recording for the first sheet is performed based on an image signal read by moving the optical system. In image recording for the second sheet, the image signal used in the image recording for the first sheet is read out from the memory, and image recording is performed. For this reason, as shown in the optical system operation in FIG. 7, the time period in which image recording for the second sheet is performed can be utilized as a time for returning the Optical system to the scanning start position.

(One-sheet Attachment Copy Sequence)

Figure 8:
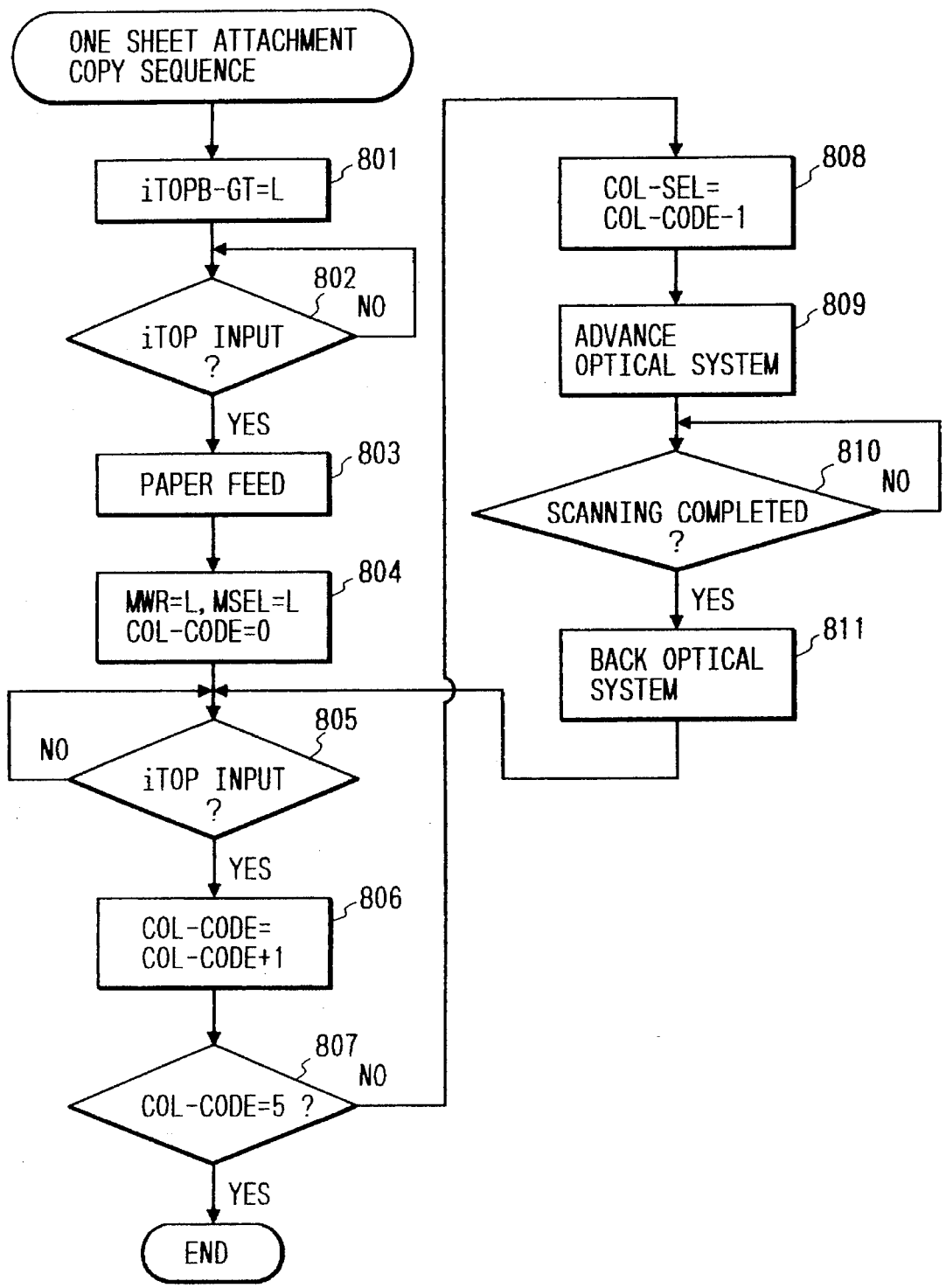
FIG. 8 is a control flow chart of a one-sheet attachment copy sequence of the first embodiment.

FIG. 8 is a control flow chart of the one-sheet attachment copy sequence executed by the CPU 116.

In step 801, the CPU 116 sets an ITOP-GT signal at L level. Thus, of ITOPA and ITOPB signals generated for every half revolutions of the transfer drum 27, only the ITOPA signal is input to the CPU 116 as an ITOP signal. The CPU 1116 performs attachment control of one recording sheet onto the transfer drum 27 and image output control for the recording sheet on the basis of ITOP signals generated for every revolutions of the transfer drum 27.

Upon detection of the input ITOP signal in step 802, the CPU 116 drives the pickup roller (32 or 33) and the paper feed rollers (30 or 31) of the selected paper feed cassette, and the registration roller 29 using a PF signal output from the I/O port 120, thereby attaching a large-size recording sheet onto the transfer drum 27 in step 803.

Thus, the leading end of the recording sheet is attached at the same position as the leading end of the recording sheet 63-a in FIG. 3 on the transfer drum 27.

In step 804, the CPU 116 sets MWR and M-SEL signals at L level, and stores "0" in the COL-CODE register allocated on its internal memory (not shown).

In step 805, the CPU 116 waits for an ITOP signal so as to identify an image recording start timing for the recording sheet attached to the transfer drum 27. When the ITOP signal is input, the CPU 116 increments the content of the COL-CODE register by 1 in step 806.

In step 807, the CPU 116 checks the content of the COL-CODE register to decide if recording operations of four colors are completed. If the content of the COL-register is one of 1 to 4, since the recording operations of four colors are not completed yet, image recording is performed in step 808 and subsequent steps.

In step 808, the CPU 116 outputs, as a COL-SEL signal, a value smaller by 1 than the content of the COL-CODE register so as to cause the selector 110 to select a predetermined color signal. In step 809, the CPU 116 causes the read-out motor controller 117 to drive the motor 15 so as to move the optical system forward, and perform image recording on the recording sheet on the basis of an image signal READ-DT read by the CCD 14. The CPU 116 waits for completion of an original scanning operation by a distance corresponding to the sheet size in step 810, and starts an operation for returning the optical system to the original scanning start position in step 615.

Figure 9:
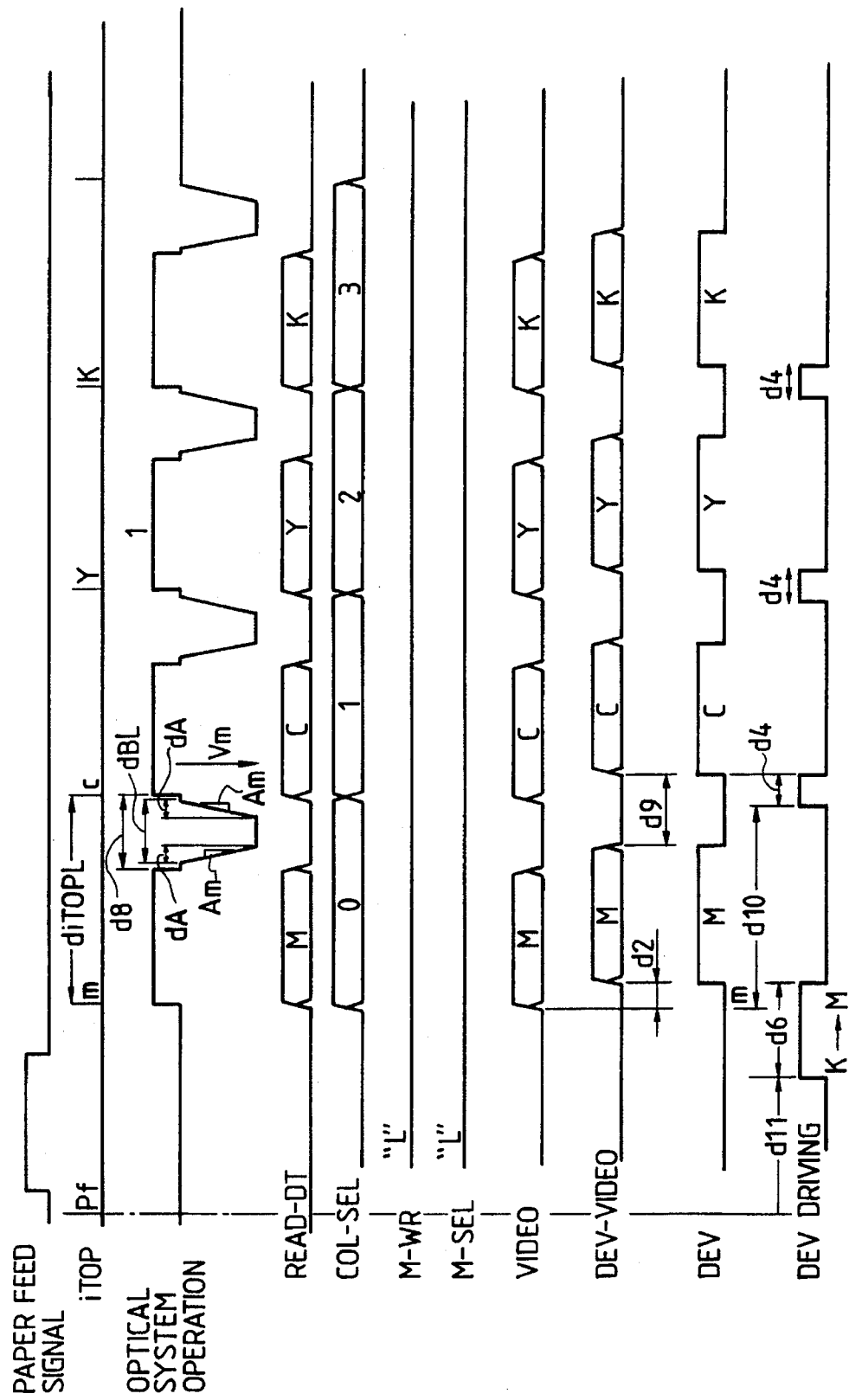
FIG. 9 is a timing chart of the one-sheet attachment copy sequence of the first embodiment.

FIG. 9 shows operation timings of respective units when image recording is performed on a large-size recording sheet in the one-sheet attachment copy sequence. In FIG. 9, the same reference symbols denote the same operation timings as those for a small-size sheet in FIG. 7.

A DEV driving signal in FIG. 9 represents exchange control timings of the developing devices.

After an elapse of a predetermined time d11 from an ITOP signal (pf) input before an ITOP signal (m) for reading a magenta image is input, the CPU 116 causes the developing device motor controller 118 to drive the developing motor 119, thereby moving the magenta developing device 5d to the developing position PS. In this case, a time required for moving the magenta developing device 5d to the developing position in place of the black developing device 5a used at the end of the immediately preceding copy sequence is the time d6 as in the case of a small-size sheet.

The CPU 116 performs moving control of the developing devices to have, as the above-mentioned time d11, a time obtained by subtracting the time d6 necessary for moving the developing devices from the sum of the time d2 required until the leading end of a magenta electrostatic latent image reaches the developing position PS and an ITOP interval dITOPL for one revolution of the transfer drum 27. Then, when the magenta developing device is exchanged with the cyan developing device, after an elapse of a time d10 from input of the ITOP signal (m) synchronized with magenta image recording, the developing device motor is driven for the time d4, thereby moving the cyan developing device 5c to the developing position PS.

In this case, the moving distance of the developing device upon exchange of the magenta developing device with the cyan developing device is the same as that in the case of a small-size sheet.

For this reason, after an elapse of the time d10 from input of the magenta ITOP signal (m), the CPU 116 moves the cyan developing device 5c to the developing position. In this case, the time d10 is a time obtained by subtracting the time d4 required for moving the developing device from the sum (a time from ITOP (m) to the beginning of development of cyan) of the ITOP interval dITOPL and the time d2.

Similarly, after an elapse of the time d10 from input of a cyan ITOP signal (c), the CPU 116 moves the yellow developing device 5b to the developing position.

Furthermore, after an elapse of the time d10 from input of a yellow ITOP signal (y), the CPU 116 moves the black developing device 5a to the developing position.

A DEV signal in FIG. 7 represents the developing devices used in correspondence with electrostatic latent images of respective colors under the above-mentioned developing device moving control.

In this manner, in the one-sheet attachment copy sequence, since image recording is performed on the basis of an image signal read from an original, the optical system is returned to the scanning start position after an original scanning operation for each recording color is completed. In the two-sheet attachment (small-size) copy sequence, if the optical system is driven in both the recording operations of the first and second sheets by returning the optical system after each recording operation without using any memory, the optical system can be returned in the one-sheet attachment (large-size) copy sequence, but the optical system cannot be returned in the small-size copy sequence if the image formation interval (ITOP interval) remains the same. A reason therefor will be explained below.

The return time of the optical system is d8 in FIG. 9. The backing (backward movement) of the optical system must be completed before an ITOP signal as an image formation start signal for the next color is input. Since the optical system is mechanically driven by the motor, its maximum speed has an upper limit, and must be attained by accelerating the motor. Also, the accelerations in the acceleration and deceleration states have upper limits. In both the small- and large-size copy sequences in FIGS. 7 and 9, the optical system returns at the maximum possible speed and at the maximum possible accelerations in both the acceleration and deceleration states. In this case, the maximum speed is Vm and the accelerations in the acceleration and deceleration states are respectively Am and −Am. In the large- and small-size copy sequences, since the maximum speeds in the return operation of the optical system are the same, times dA used for accelerating and decelerating the motor are also the same.

In this embodiment, when the original size is a ledger size, the optical system scans the maximum distance of 423 mm of large-size originals. When the original size is a letter size, the optical system scans the maximum distance of 216 mm of small-size originals. Thus, in the case of a large-size original, the return distance of the optical system is twice that in the case of a small-size original.

When the optical system is moved across a distance of a large-size original, and when it is moved across a distance twice that of a small-size original while the acceleration/deceleration time dA remains constant, a moving time dBS for the small-size original does not become half a moving time dBL for the large-size original, and is longer by half the acceleration time dA. This is because the backing speed of the optical system is controlled in a trapezoidal pattern by accelerating/decelerating the motor.

An original scanning time, attained by advancing the optical system, for a small-size original is half that for a large-size original.

The interval between adjacent ITOP signals as image recording sync signals for a small-size original is half that for a large-size original, and the sum of the advancing time of the optical system for scanning an original and the backing time of the optical system for returning the optical system to the original scanning start position must fall within the ITOP interval.

More specifically, a total of the advancing and backing times of the optical system for a small-size original is larger by half the acceleration time dA than half a total time for a large-size original.

Assume that a time required for reciprocally moving the optical system upon scanning of a large-size original, which is attached alone onto the transfer drum 27, is equal to the ITOP interval for every revolution of the transfer drum 27 under a predetermined optical system driving condition.

Under the same optical system driving condition, when a small-size original is to be scanned while two recording sheets are attached onto the transfer drum, the time required for reciprocally moving the optical system is longer by ½ the time dA than the ITOP interval for every half revolutions of the transfer drum 27.

In other words, depending on the optical system driving condition, large-size originals can be successively scanned, but small-size originals cannot be successively scanned.

In the above description, no stop time is assured between the advancing and backing movements of the optical system. However, in the actual driving operation of the optical system, since the optical system has an inertia, a mechanical vibration is generated in a driving transmission system, and the load torque is equivalently increased to disturb a predetermined acceleration unless a certain stop time is assured. The same stop time must be assured for both the small- and large-size originals since the maximum speed of the optical system remains the same.

As described above, since the time required for reciprocally moving the optical system for a small-size original is half that for a large-size original, if the stop time for a small-size original is half that for a large-size original, the ratios of the stop times to the times required for reciprocally moving the optical system are the same for both large- and small-size originals.

However, since the same stop time must be assured in practice, the driving speed of the optical system for small-size originals must be increased by a speed corresponding to half the stop time.

Even in the case of a small-size sheet, when the optical system is returned after every image recording operations, the return speed and acceleration must be increased accordingly, but they have upper limits. For this reason, the optical system need not be returned after every image recording operations since the memory is used in an original scanning operation corresponding to a small-size sheet.

More specifically, when a plurality of sheets are attached to the transfer drum as in this embodiment, image recording for the first sheet is performed based on a signal read by driving the optical system, and image recording for the second sheet is performed by reading out the image used in the image recording for the first sheet from the memory, so that the image recording operations can be performed without requiring any high-speed driving operation of the optical system.

In this embodiment, the maximum scanning length of small-size originals is 216 mm (letter size). That is, a memory capacity corresponding to an original having a scanning length of 216 mm need only be prepared.

In this embodiment, since image recording is performed at a resolution of 400 dots/inch in both the main scanning direction (electrical scanning by the CCD) and the sub-scanning direction (read scanning by the optical system), a memory capacity for 14,960,000 pixels for a letter size (main scanning length=279.4 mm and sub-scanning length= 216 mm), and a memory capacity for 15,460,000 pixels for an A4size (main scanning length=297 mm and sub-scanning length=210 mm) are required. For this reason, a memory size for the A4size is prepared.

[Second Embodiment]

Figure 10:
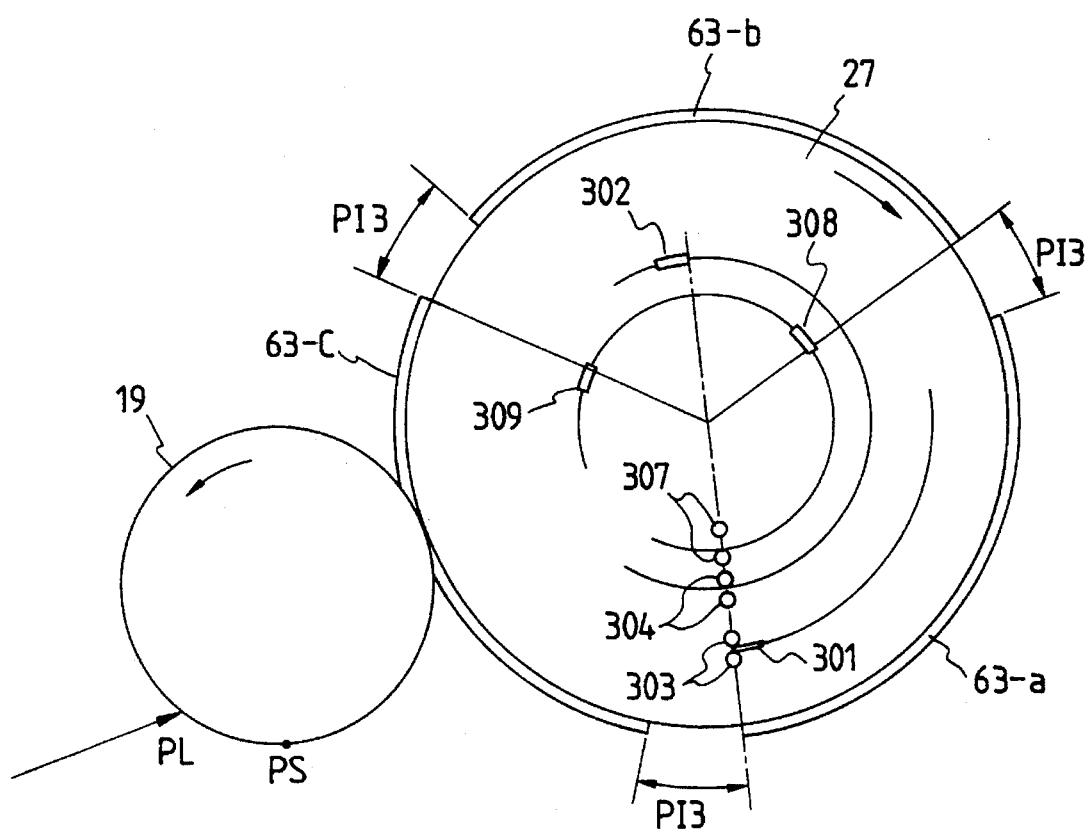
FIG. 10 is a sectional view showing the details of a transfer drum according to the second embodiment of the present invention.

FIG. 10 shows the relationship between a photosensitive drum 19 and a transfer drum 27 according to the second embodiment of the present invention. The second embodiment adopts an arrangement for attaching a maximum of three recording sheets onto the transfer drum 27 in a color copying machine having the same arrangement as that in the first embodiment. The transfer drum 27 and the photosensitive drum 19 have the same arrangements as those in the first embodiment. That is, the transfer drum 27 has a diameter of 160 mm and a circumference of 502.6 mm. Photosensors 303 and 304 and flags 301 and 302 are used for detecting the timings of large- and small-size sheets as in the first embodiment. In this embodiment, a maximum of three recording sheets are attached onto the transfer drum 27, and color image recording operations for the three recording sheets are simultaneously performed.

A sheet size, which allows three sheets to be simultaneously attached, must have a length, in the circumferential direction of the transfer drum 27, shorter than ⅓ the circumference of the transfer drum, i.e., 167.5 mm. For example, this applies to a case wherein A5-size sheets are attached onto the transfer drum 27, so that their widthwise directions (148.5 mm) are parallel to the circumferential direction of the transfer drum 27.

FIG. 10 shows a state wherein three A5-size recording sheets are attached in the circumferential direction of the transfer drum 27 at equal intervals. In this case, a sheet interval PI3 is 19 mm. Flags 308 and 309 rotated together with the transfer drum 27 are respectively arranged at positions corresponding to the leading ends of the second and third recording sheets (63-b, 63-c). A photosensor 307 for detecting passage of these flags 308 and 309 is fixed to the main body.

Figure 11:
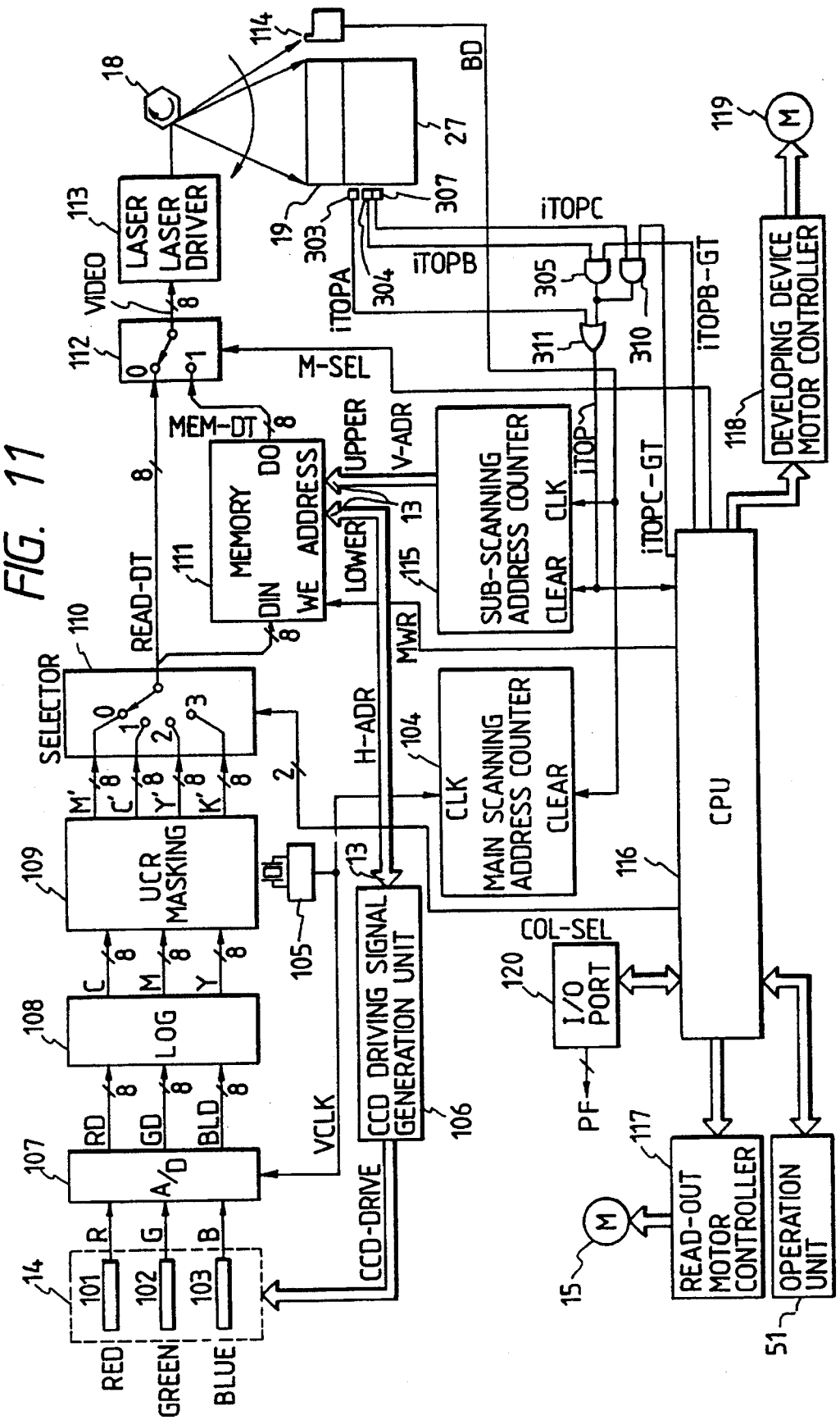
FIG. 11 is a block diagram showing a controller unit according to the second embodiment of the present invention.

FIG. 11 shows an arrangement of a controller unit of this embodiment. The arrangement shown in FIG. 11 is basically the same as that shown in FIG. 1, except for an AND gate 310 for selecting an ITOPC signal from the photosensor 307 for detecting the leading ends of the second and third recording sheets, and an OR gate 311 for logically ORing a selection signal ITOPC-GT from a port of a CPU 116, an ITOPA signal, the output from a gate 305, and the output from the gate 310, and generating an ITOP signal.

In this arrangement, when the ITOPC-GT signal is set at L level, the one- and two-sheet attachment copy sequences described in the first embodiment can be realized under the same control.

A three-sheet attachment copy sequence for three recording sheets attached onto the transfer drum 27 will be described below.

(Three-sheet Attachment Copy Sequence)

Figure 12:
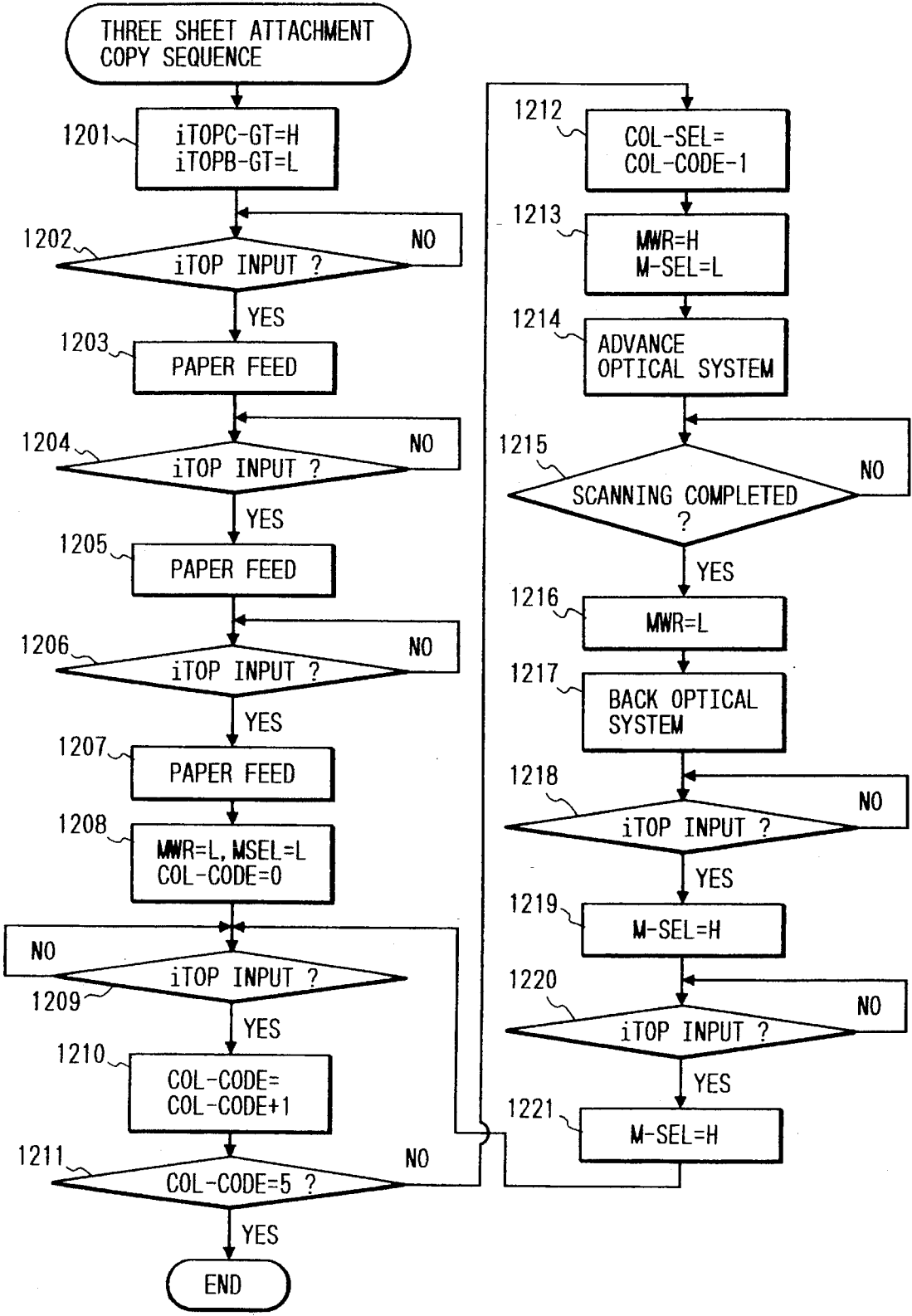
FIG. 12 is a control flow chart of a three-sheet attachment copy sequence of the second embodiment.

FIG. 12 is a control flow chart of the three-sheet attachment copy sequence executed by a CPU 116.

In step 1201, the CPU 116 sets an ITOPB-GT signal at L level, and sets an ITOPC-GT signal at H level. Thus, ITOPA and ITOPC signals are logically ORed by the gate 311 when the flags 301, 308, and 309 pass the corresponding photosensors upon rotation of the transfer drum 27, and the OR signal is input to the CPU 116 as an ITOP signal. The CPU 116 performs attachment control of three recording sheets onto the transfer drum 27 and image output control for the three recording sheets in response to ITOP signals generated three times for every revolutions of the transfer drum 27.

Upon detection of input of an ITOP signal in step 1202, the CPU 116 drives the pickup roller (32 or 33) and the paper feed rollers (30 or 31) of the selected paper feed cassette, and the registration roller 29 using a PF signal output from the I/O port 120, thereby attaching the first recording sheet onto the transfer drum 27 in step 1203. Upon detection of input of the next ITOP signal in step 1204, the CPU attaches the second recording sheet onto the transfer drum in step 1205.

Upon detection of input of the next ITOP signal in step 1206, the CPU attaches the third recording sheet onto the transfer drum in step 1207.

In this manner, the three recording sheets are attached onto the transfer drum 27, as shown in FIG. 10.

In step 1208, the CPU 116 sets MWR and M-SEL signals at L level, and stores "0" in a COL-CODE register allocated on its internal memory (not shown).

In step 1209, the CPU 116 waits for an ITOP signal so as to identify an image recording start timing for the first recording sheet attached to the transfer drum 27. When the ITOP signal is input, the CPU 116 increments the content of the COL-CODE register by 1 in step 1210.

In step 1211, the CPU 116 checks the content of the COL-CODE register to decide if recording operations of four colors are completed. If the content of the COL-register is one of 1 to 4, since the recording operations of four colors are not completed yet, image recording is performed in step 1212 and subsequent steps.

In step 1212, the CPU 116 outputs, as a COL-SEL signal, a value smaller by 1 than the content of the COL-CODE register so as to cause a selector 110 to select a predetermined color signal. In step 1213, the CPU 116 sets the MWR signal at H level to store an image signal READ-DT read by a CCD 14 in a memory 111, and sets the M-SEL signal at L level to perform image recording of the first sheet on the basis of the signal READ-DT. After the above-mentioned preparation, the CPU 116 causes a read-out motor controller 117 to drive a motor 15 so as to move an optical system forward, performs image recording on the first sheet on the basis of the image signal READ-DT read by the CCD 14, and stores the image signal READ-DT in the memory 111 in step 1214.

The CPU 116 waits for completion of an original scanning operation by a distance corresponding to a sheet size in step 1215, and sets the MWR signal at L level to end the write access to the memory in step 1216. The CPU 116 starts an operation for returning the optical system to the original scanning start position in step 1217, and waits for an ITOP signal corresponding to the second sheet in step 1218. When the ITOP signal is input, the CPU 116 sets the M-SEL signal at H level in step 1219 to perform image recording on the second sheet on the basis of an image signal MEM-DT obtained by reading out the image signal stored in the memory 111.

In step 1220, the CPU 116 waits for an ITOP signal corresponding to the third sheet. When the ITOP signal is input, the CPU 116 sets the M-SEL signal at H level again in step 1221 to perform image recording on the third sheet on the basis of the image signal MEM-DT obtained by reading out the image signal stored in the memory 111.

In this manner, in the three-sheet attachment copy sequence, three recording sheets each having a size shorter than ⅓ the circumference of the transfer drum 27 are attached onto the transfer drum 27, and image recording for the first sheet is performed using an image signal read by moving the optical system. Then, image recording operations for the second and third sheets are performed by reading out the image signal used in the image recording for the first sheet from the memory 111. These operations are repeated in units of recording colors, thereby simultaneously executing color recording on the three recording sheets on the transfer drum 27. For this purpose, the image recording time for the second and third sheets is used as a time for returning the optical system to the scanning start position.

In the description of this embodiment, the memory is used in the two- and three-sheet attachment copy sequences. However, when the size of the transfer drum 27 is increased, or when the rotational speed of the transfer drum 27 is low, since a time corresponding to the interval between two adjacent recording sheet is prolonged, the optical system may be returned even when two recording sheets are attached onto the transfer drum 27. In this case, the optical system may be driven for each of two recording sheets on the transfer drum even in the two-sheet attachment copy sequence for recording an A4- or letter-size original image.

When three A5- or mini-size recording sheets are attached onto the transfer drum, image recording operations using the memory are performed. In this manner, when a sheet size, which allows the optical system to return to its home position during a time corresponding to the interval of adjacent sheets, is used, the optical system may be driven for every recording operations, and only when a sheet size, which does not allow the optical system to return to its home position, is used, the memory may be used, thus minimizing the memory capacity.

In this embodiment, image formation can be performed on four or more sheets if the number of flags on the transfer drum is increased.

[Third Embodiment]

In each of the above embodiments, the operation for copying an image onto a plurality of sheets using a memory in a color copying machine using a transfer drum has been described. The present invention can also be applied to a color overlaying development type color copying machine for sequentially developing M, C, Y, and K toner images on a large-diameter photosensitive drum to overlap each other without using a transfer drum, and simultaneously transferring four color toner images on the drum onto a recording sheet.

Figure 13:
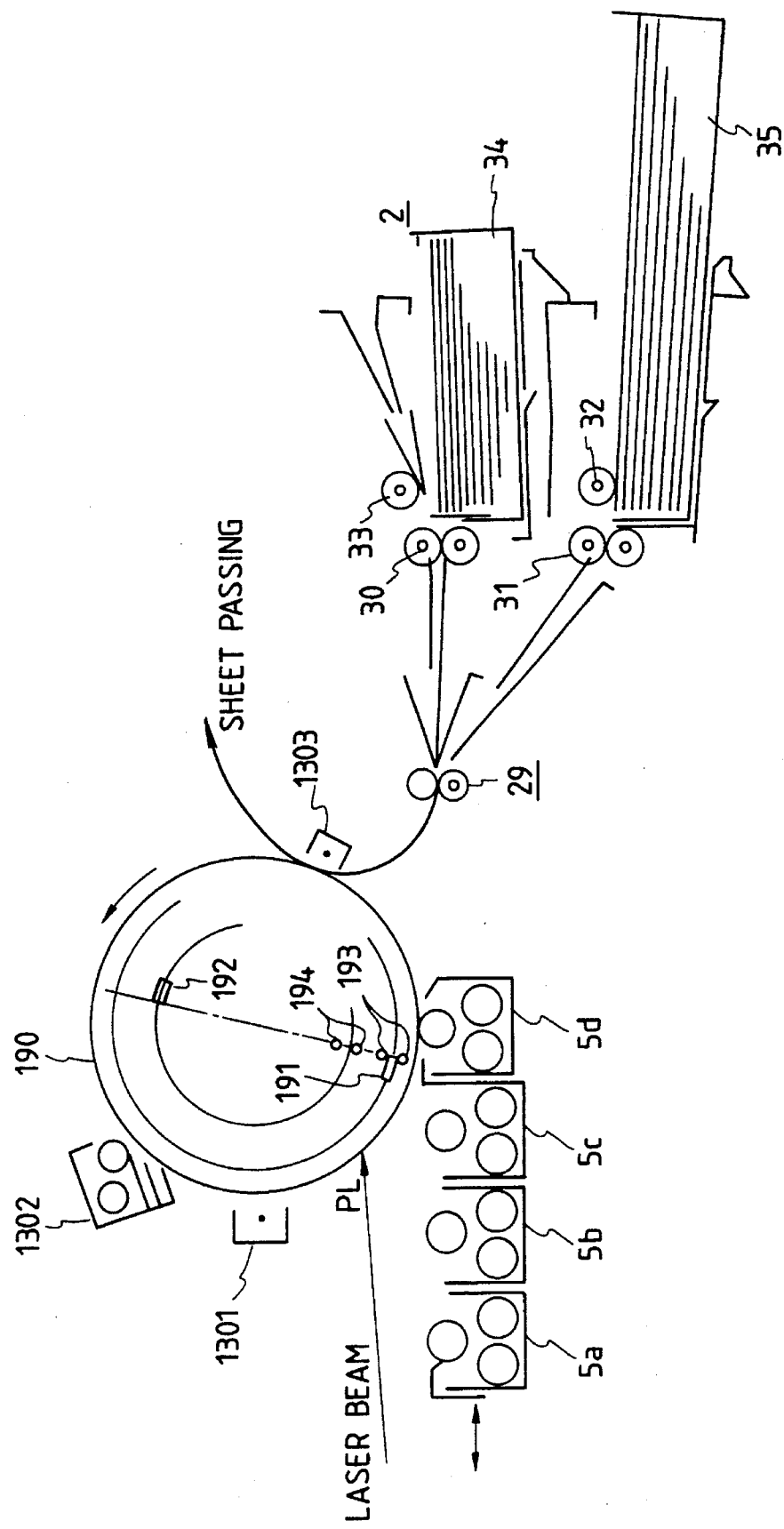
FIG. 13 is a schematic view showing an arrangement according to the third embodiment of the present invention.

FIG. 13 shows an arrangement wherein color images for two small-size recording sheets are simultaneously formed on a photosensitive drum 190 having the same diameter as that of the transfer drum 27 in the first embodiment.

A primary charger 1301 is arranged near the photosensitive drum 190. A cleaner 1302 is arranged to be able to approach or separate from the photosensitive drum 190. Flags 191 and 192 are attached on the photosensitive drum 190 at positions symmetrical about the center of its rotation, and are rotated together with the drum 190. Photosensors 193 and 194 respectively detect passage of the flags 191 and 192. The photosensor 193 generates an ITOPA signal, and the photosensor 194 generates an ITOPB signal. These components have the same function as those attached to the transfer drum 27 in the first embodiment.

Like in the first embodiment, when a recording sheet has an A4 size, a letter size, or the like, images for two sheets are formed on the photosensitive drum 190. In this case, the outputs from the two photosensors 193 and 194 are used as ITOP signals. Image formation for a small-size sheet will be described below.

When an ITOPA signal is input from the photosensor 193, an optical system is driven like in the first embodiment, and the first latent image is formed on the photosensitive drum 190 from a position corresponding to the flag 191 using a signal read by the optical system. The latent image is developed using a magenta developing device 5d, and the image signal at that time is stored in a memory as in the first embodiment. When an ITOPB signal is input from the photosensor 194, the image signal used in image formation for the first image is read out from the memory, and the second magenta latent image is formed on the photosensitive drum 190 from a position corresponding to the flag 191. The latent image is then developed, and the optical system, which was moved forward for reading the first image, is returned to a scanning start position.

Upon repetition of these operations in correspondence with cyan, yellow, and black developing colors, two color toner images obtained by overlaying four color toner images are formed on the photosensitive drum 190. During these operations, the cleaner 1302 is separated apart from the photosensitive drum surface. Thereafter, two small-size recording sheets are sequentially fed from a cassette 34 in synchronism with the ITOPA and ITOPB signals, and the two color toner images on the photosensitive drum 190 are transferred onto the two recording sheets by a transfer charger 1303, thus obtaining two color images like in the first embodiment.

When a recording sheet has an A3 size or a ledger size, an image signal for only one sheet can be recorded on the photosensitive drum 190 like in the first embodiment. In this case, the optical system is reciprocally driven on the basis of an ITOP signal from the photosensor 193 without using the memory, thereby performing color image recording.

As is apparent from the above description, in this embodiment, the photosensitive drum 190 has both the functions of the transfer drum 27 and the photosensitive drum 19 in the first embodiment. More specifically, since an image signal for the first image is read out from the memory, and is used for image formation of the second image like in the first embodiment, the scanning optical system need not perform any high-speed return operation.

In this embodiment as well, when three or more flags synchronized with the photosensitive drum 190 are provided thereto, simultaneous color image recording for three or more sheets can be attained as in the second embodiment.

[Another Embodiment]

In the above description, a plurality of flags synchronized with a transfer drum or a photosensitive drum are used as sync signals for recording images for a plurality of sheets. The flags are not particularly limited to optical detection means used in the above description as long as they can detect that the revolving position of a drum reaches a predetermined position. For example, a time corresponding to a distance between adjacent flags may be counted by a timer counter in place of the flags, and pseudo sync signals may be generated.

A recording apparatus, which can adopt the present invention, may comprise an intermediate transfer member in place of a transfer drum. The present invention can be applied not only to an image recording apparatus for sequentially performing color recording in units of magenta, cyan, yellow, and black colors, but also to an apparatus for simultaneously performing image formation of a plurality of colors. In this case, a memory stores image data of a plurality of colors to be recorded simultaneously, and these data are simultaneously read out from the memory.

As described above, upon execution of color image recording for a plurality of sheets at a predetermined sheet interval, image recording for the second and subsequent sheets is performed by reading out, from a memory, an image recorded in image formation for the first sheet, thus allowing an optical system to return at a low driving speed. For this reason, the scanning speed upon reading of an image can become close to the return scanning speed, and the variable speed range of the optical system can be narrowed. As a result, the optical system can be stably driven with high precision without deteriorating productivity of recorded images, and this leads to high image quality of copy outputs.

Since the optical system can be returned at a low speed, noise upon returning of the optical system can be minimized, and a mechanical vibration upon switching between backward and forward movements of the optical system can be minimized as well, thus allowing high-quality image formation.

When the access/non-access modes of a memory are controlled according to the sheet size upon execution of image recording for a plurality of sheets, a memory capacity corresponding to a predetermined sheet size need only be prepared in place of a memory capacity corresponding to a maximum sheet size, thus improving productivity of recorded images at low cost.

In particular, when a plurality of images are recorded using an image carrier having a predetermined distance (circumference), a memory is used in only image recording for a sheet size, which shortens the sheet interval, so that the optical system need only be returned at a low driving speed. For this reason, the scanning speed upon reading of an image can become close to the return scanning speed, and the variable speed range of the optical system can be narrowed. As a result, the optical system can be stably driven with high precision without deteriorating productivity of recorded images, and this leads to high image quality of copy outputs.

[Still Another Embodiment]

In the first embodiment, one of the two- and one-sheet attachment copy sequences is selected according to the sheet size. However, the present invention is not limited to the sheet size. For example, one of the two copy sequences may be selected according to a copying magnification and a scanning distance upon reading of an original.

In this embodiment to be described below, whether or not an optical system can be returned during a moving time (a sheet interval time) corresponding to a distance between two attached recording sheets is checked, and a recording mode for recording an identical image on a plurality of sheets using a memory or a recording mode for recording an identical image on a plurality of sheets by scanning the optical system in every recording operations is determined according to the checking result.

Like in the first embodiment, assume that when two recording sheets having a letter size (sub-scanning sheet length=216 mm) are evenly attached onto a transfer drum, the optical system can be returned to the home position within the sheet interval time when the copying magnification is an equal magnification.

In this case, when the copying magnification is a reduction magnification, since the original scanning distance is prolonged, the time required for returning the optical system is also prolonged, and the optical system cannot be returned within the sheet interval time.

More specifically, when letter-size originals are copied onto letter-size sheets by scanning them at a copying magnification of 100%, the two-sheet attachment sequence using no memory can be executed. However, when letter-size originals are copied onto letter-size sheets in a reduced scale, since the scanning distance may be prolonged (e.g., when an original having a size larger than a letter size is to be scanned), the two-sheet attachment copy sequence using the memory as in the first embodiment is required.

This embodiment will be described in detail below.

Like in the first embodiment, when an acceleration upon backing of the optical system is represented by Am, a maximum speed (a speed in a uniform motion) upon backing of the optical system is represented by Vm, an acceleration time (deceleration time) upon backing of the optical system is represented by dA, an original scanning speed upon advancing of the optical system is represented by Vf, and a scanning distance upon advancing of the optical system is represented by Xf, the time (T) required for reciprocating the optical system is given by:

$$T = (Xf/Vf) + 2 \times dA + (Xf - Vm \times dA)/Vm$$
$$= (Xf/Vf) + 2 \times dA + Xf/Vm - dA$$
$$= (Xf/Vf) + dA + Xf/Vm$$
$$= Xf(1/Vf + 1/Vm) + dA$$

where Vm×dA: the moving distance of the optical system when it is accelerated or decelerated upon backing.

When two copy sheets are attached onto the transfer drum, the recording time per sheet is a time dITOP corresponding to half a revolution of the transfer drum, as can be seen from FIG. 7.

If the time T calculated by the above equation can fall within the time dITOP, images can be recorded on two recording sheets by scanning the optical system in every recording operations.

When a letter-size original is recorded on a letter-size sheet at an equal magnification, the time (T) required for reciprocating the optical system is given by the following equation. In this case, the scanning distance Xf is 216 mm. If the original scanning speed at an equal magnification is set to be Vf=100, we have:

$$T = 216(1/100 + 1/Vm) + dA$$
$$= 216/100 + 216/Vm + dA$$

Similarly, when an original is recorded on a letter-size sheet by scanning it in a reduced scale of 70%, the time (T) required for reciprocating the optical system is given by the following equation. In this case, since the scanning distance Xf is 216 mm/0.7, and the scanning speed upon advancing of the optical system is Vf=100/0.7, we have:

$$T = 216/0.7(0.7/100 + 1/Vm) + dA$$
$$= 216/100 + (216/Vm)/0.7 + dA$$

As can be seen from this equation, when an original is recorded on the entire surface of a letter-size sheet at a magnification of 70%, the return time of the optical system is prolonged by (216/Vm)/0.7− 216/Vm as compared to the copy mode at an equal magnification since the scanning distance is prolonged.

In this manner, when the copying magnification is decreased, the read scanning speed is increased, the scanning time is prolonged since the image recording time is constant, and hence, the return time is prolonged.

For this reason, in the reduction copy mode, the optical system cannot be returned within the sheet interval time between recording sheets. At this time, a read image is stored in the memory, and image recording operations for the second and subsequent sheets are performed using the image read out from the memory. More specifically, when the reciprocating time (T) given by the above equation and considering the scanning speed determined by the copying magnification exceeds the recording time per recording sheet (the time dITOP corresponding to half a revolution of the transfer drum, as can be seen from FIG. 7), the two-sheet attachment copy sequence using the memory is executed.

For example, in this embodiment, when an original is recorded on a letter-size recording sheet at a magnification of 100%, the reciprocating time (T) of the optical system given by the above equation is just equal to the recording time per recording sheet. For this reason, when a reduction copy operation is executed for small-size recording sheets, the two-sheet attachment copy sequence using the memory is executed.

When a known trimming copy operation is executed, since only a portion of an original is trimmed and copied, the scanning distance Xf and the scanning speed Vf of the optical system can be independently set.

The time (T) required for reciprocating the optical system is determined by the following equation:

$$T = Xf(1/Vf + 1/Vm) + dA$$

Therefore, in the trimming copy mode, the read scanning speed Vf depending on a copying magnification and the read scanning distance Xf determined by a trimming area are substituted in the above equation, and when the reciprocating time (T) exceeds the recording time per recording sheet (e.g., dITOP), the two-sheet attachment copy sequence using the memory is executed; otherwise, the two-sheet attachment copy sequence using no memory is executed.

Figure 14:
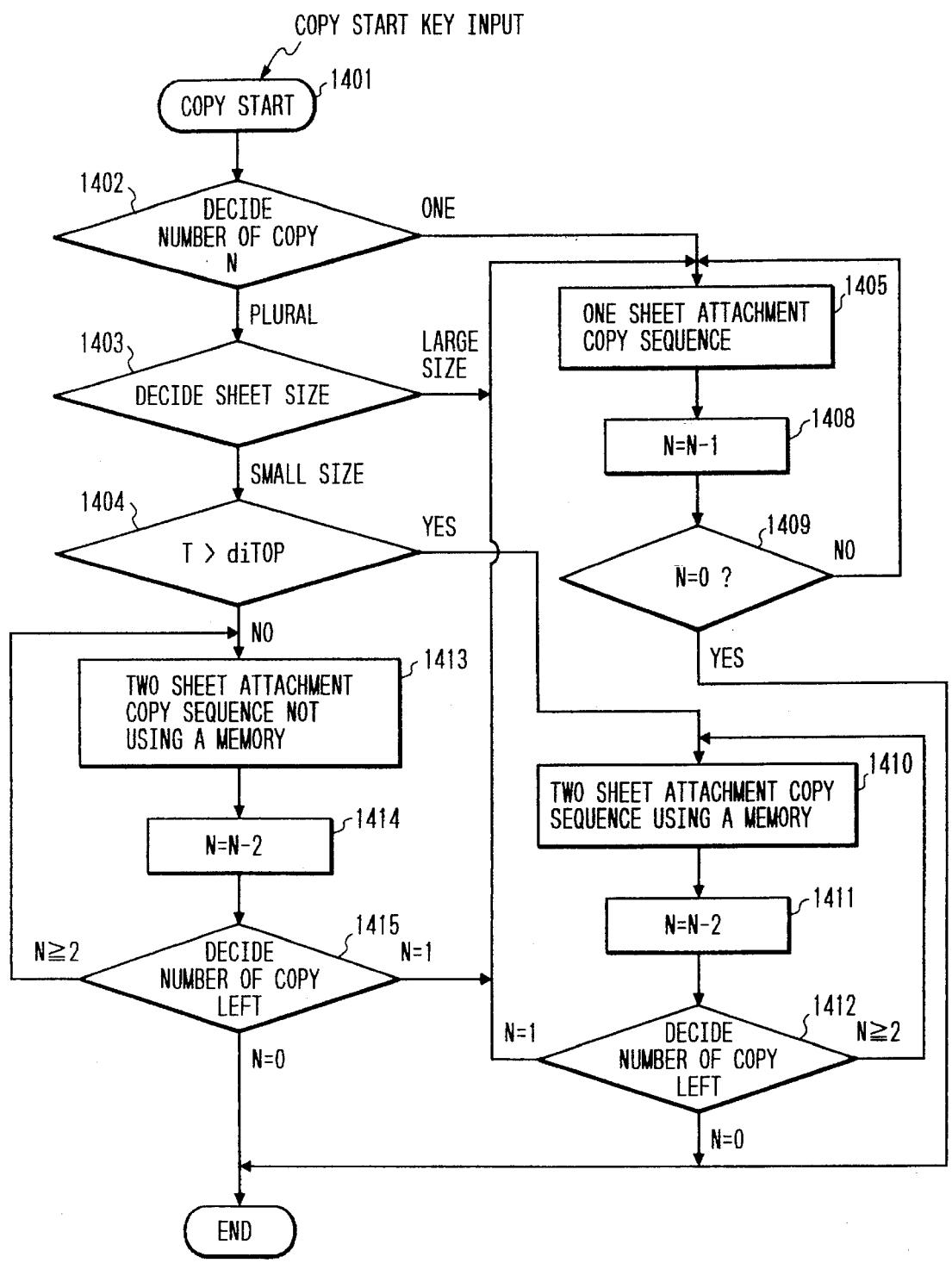
FIG. 14 shows a control flow of an another embodiment.

FIG. 14 shows a control flow of this embodiment. Note that the arrangement of the apparatus is substantially the same as that of the first embodiment.

In FIG. 14, steps 1401 to 1409 respectively correspond to steps 501 to 509 in FIG. 5.

In this control flow, if it is determined in step 1403 that a sheet size is a small size, one of the two-sheet attachment copy sequence using the memory and the two-sheet attachment copy sequence using no memory is selected on the basis of a setting value of a copying magnification and a designated value of a trimming area from an operation unit (not shown) in step 1404. In this selection, the time (T) required for reciprocating the optical system is determined by the following equation on the basis of the scanning speed determined by a variable magnification and the read scanning distance Xf determined by the trimming area:

$$T=Xf(1/Vf+1/Vm)+dA$$

If the time (T) exceeds the recording time (dITOP) per recording sheet, since the optical system cannot be returned within the sheet interval time between the recording sheets, the two-sheet attachment copy sequence using the memory is executed in step 1410. If the time (T) does not exceed the recording time dITOP per recording sheet, since the optical system can be returned within the sheet interval time between the recording sheets, the two-sheet attachment copy sequence using no memory is executed in step 1413.

The two-sheet attachment copy sequence using the memory is the same as that shown in FIG. 6. After the two-sheet attachment copy sequence in step 1410 or 1413, the remaining number of copies is checked in steps 1411 and 1412 or steps 1414 and 1415 as in FIG. 5.

FIG. 15 shows a control flow of the two-sheet attachment copy sequence using no memory. In FIG. 15, steps 1501 to 1516 are the same as those in the two-sheet attachment copy sequence using the memory shown in FIG. 6. However, since image data is not written in the memory during image formation for the first sheet, MWR=L is set in step 1511.

When an ITOP signal corresponding to the second sheet is detected in step 1516, the optical system is advanced in step 1517 to read an image. If completion of scanning of an effective read area determined by, e.g., a trimming area is detected in step 1518, the optical system is returned to the scanning start position at the maximum speed Vm while being accelerated/decelerated at the acceleration dA in step 1519 like in the first embodiment.

In this manner, according to this embodiment, since use of the image memory is determined in consideration of a variable magnification and a read area, even when the recording sheet size is equal to or smaller than the memory capacity, if the optical system can be returned to the home position, image formation using no memory can be executed.

In this manner, by avoiding use of the memory as much as possible, a full-color copy operation free from image misregistration in units of colors caused by a shift of read-out timings by a maximum of one line upon reading out of an image from the memory in units of recording colors can be performed. In addition, in a copy mode having a large reduction magnification at which the influence of image misregistration is not so conspicuous, a high-speed copy operation can be performed by the two-sheet attachment copy sequence using the memory without decreasing a image output throughput.

What is claimed is:

1. An image recording apparatus comprising:

reading means for reading an original image and for outputting an image signal corresponding to the original image;

storage means for storing the image signal output from said reading means;

image forming means for forming an image on a recording medium based on one of the image signal output from said reading means and the image signal stored in said storage means;

a transfer medium holding member for holding a first transfer medium and a second transfer medium for transferring images formed on said recording medium onto said first transfer medium and said second transfer medium; and control means for controlling said reading means and said storage means so that an image to be transferred onto said first transfer medium held on said transfer medium holding member is formed based on the image signal output from said reading means, and an image to be transferred onto said second transfer medium held on said transfer medium holding member is formed based on the image signal stored in said storage means.

2. An apparatus according to claim 1, further comprising:

selection means for selecting one of the image signal output from said reading means and the image signal stored in said storage means, and for outputting a selected image signal, wherein said control means controls a selection operation of said selection means.

3. An apparatus according to claim 1, wherein said image forming means sequentially forms images of different colors on said recording medium so as to transfer images of different colors onto said first transfer medium and said second transfer medium which are held on said transfer medium holding member.

4. An image recording method comprising:

a) an inputting step for inputting an image signal;

b) a forming step for forming an image on a recording medium based on the input image signal;

c) a storing step for storing the input image signal in a memory simultaneously with said forming step;

d) a holding step for holding a first transfer medium and a second transfer medium on a holding member;

e) a transferring step for transferring the image formed in said forming step onto the first transfer medium held on the holding member;

f) a reading step for reading out the image signal stored in said storing step, and for forming an image on the recording medium based on the read-out image signal; and a second transferring step for transferring the image formed in said reading step onto the second transfer medium held on the holding member.

5. A method according to claim 4, further comprising:

h) a second inputting step for inputting a second image signal;

i) a second forming step for forming an image having a color different from a color of the image formed in said forming step on the recording medium based on the input second image signal;

j) a second storing step for storing the input second image signal in the memory simultaneously with said second forming step;

k) a third transferring step for transferring the image formed in said second forming step onto the first transfer medium held on the holding member;

l) a second reading step for reading out the second image signal stored in said second storing step, and for forming an image in a same color as the color of the image formed in said second forming step on the recording medium based on the read-out second image signal; and m) a fourth transferring step for transferring the image formed in said second reading step onto the second transfer medium held on the holding member.

6. A method according to claim 4, wherein said inputting step comprises inputting an image signal output from a reading means for reading an original image.

7. An image recording apparatus comprising:

input means for inputting an image signal;

storage means for storing the image signal input by said input means;

image forming means for forming an image on a recording sheet based on one of the image signal input by said input means and the image signal stored in said storage means;

detection means for detecting a size of the recording sheet;

control means for when an identical image is to be formed on a plurality of recording sheets, executing one of (1) a first mode for performing image formation based on an image signal repetitively input by said input means and (2) a second mode for performing image formation on a first recording sheet based on an image signal input by said input means and for performing image formation on second and subsequent recording sheets based on an image signal stored in said storage means, the one of the first mode and the second mode being executed in accordance with a detected size of a recording sheet; and selection means for selecting one of the image signal input by said reading means and the image signal stored in said storage means, and for outputting the selected image signal, wherein said control means controls said selection means based on the size of the recording sheet.

8. An apparatus according to claim 7, wherein said input means comprises scanning means for scanning an original to read an original image.

9. A duplicating apparatus comprising:

scanning means which moves one of forward and backward to scan an original;

reading means for reading an image of the original scanned by said scanning means and for outputting an image signal;

a memory for storing the image signal output from said reading means;

image forming means for forming an image on a recording medium based on the image signal output from said reading means and the image signal stored in said memory;

a holding member for holding a transfer medium so that the image formed on said recording medium by said image forming means is transferred repeatedly onto a same transfer medium, said holding member for holding a first transfer medium and a second transfer medium; and control means for controlling said scanning means, said reading means, said memory, said image forming means and said holding member so that (i) an image formed on said recording medium which is transferred onto the first transfer medium while said scanning means is moving forward is based on the image signal output from said reading means, (ii) an image formed on said recording medium which is transferred onto the second transfer medium when said scanning means commences backward movement is based on the image signal stored in said memory, and (iii) said scanning means completes the backward movement before the image is completely transferred to the second transfer medium.

10. An apparatus according to claim 9, wherein said control means controls said scanning means said reading means, said memory, said image forming means and said holding member so that subsequent images are transferred onto the first transfer medium and the second transfer medium.

11. An apparatus according to claim 9, wherein said reading means reads the image in units of a predetermined color component.

12. A duplicating method used in a duplicating apparatus which includes scanning means which moves one of forward and backward to scan an original, reading means for reading an image of the original scanned by the scanning means and for outputting an image signal, a memory for storing an image signal output from the reading means, image forming means for forming an image on a recording medium based on the image signal output from the reading means and an image signal stored in the memory, a holding member for holding a transfer medium so that the image formed on the recording medium by the image forming means is transferred repeatedly onto the same transfer medium, the holding member for holding a first transfer medium and a second transfer medium, said duplicating method comprising:

a) a forming step for forming an image on the recording medium based on the image signal output from the reading means while the scanning means is moving forward;

b) a transferring step for transferring the image formed in said forming step onto a first transfer medium;

c) a second forming step for forming an image on the recording medium based on the image signal stored in the memory when the scanning means commences a backward movement;

d) a second transferring step for transferring the image formed in said second forming step onto a second transfer medium, wherein the scanning means commences a backward movement before the image formed in said second forming step is completely transferred onto the second transfer medium.

13. A method according to claim 12, wherein said forming step, said transferring step, said second forming step and said second transferring step are repeated for each color component in an original comprised of a plurality of color components.

14. A duplicating apparatus comprising:

scanning means which moves one of forward and backward to scan an original;

reading means for reading an image of the original scanned by said scanning means and for outputting an image signal;

a memory for storing the image signal output from said reading means;

image forming means for forming an image on a recording medium by superimposing images having a plurality of color components based on the image signal output from said reading means and the image signal stored in said memory, said recording medium having a size sufficient to include a plurality of images;

control means for controlling said scanning means, said reading means, said memory and said image forming means so that (i) an image having a predetermined color component is formed on said recording medium based on the image signal output from the reading means while said scanning means is moving forward, (ii) the image having a predetermined color component is formed on said recording medium based on the image signal stored in the memory when said scanning means commences a backward movement, (iii) said scanning means completes the backward movement before the image having a predetermined color component is completely transferred to the recording medium, and (iv) forming the image based on the image signal output from said reading means and forming the image based on the image signal stored in said memory are repeated for each color component in the plurality of color components.

15. A duplicating method used in a duplicating apparatus which includes scanning means which moves one of forward and backward to scan an original, reading means for reading an image of the original scanned by the scanning means and for outputting an image signal, a memory for storing the image signal output from the reading means, image forming means for forming an image on a recording medium by superimposing images having a plurality of color components based on the image signal output from the reading means and the image signal stored in the memory, the recording medium having a size sufficient to include a plurality of images, said duplicating method comprising:

a) a forming step for forming an image having a first color component on the recording medium based on the image signal output from the reading means while the scanning means is moving forward;

b) a second forming step for forming the image having the first color component on said recording medium based on the image signal stored in the memory when the scanning means commences backward movement, wherein the scanning means commences the backward movement before said second forming step is complete; and c) a repeating step for repeating said forming step and said second forming step for each color component in the plurality of color components.

* * * * *

UNITED STATES PATENT AND TRADEMARK OFFICE
CERTIFICATE OF CORRECTION

PATENT NO. : 5,481,365

DATED : January 2, 1996

INVENTOR(S) : Shinobu Arimoto

It is certified that error appears in the above-identified patent and that said Letters Patent is hereby corrected as shown below:

COLUMN 1 :

Line 8, "in form" should read --form--.

COLUMN 9 :

Line 15, "Optical" should read --optical--.

COLUMN 20 :

Line 48, "a" should read --g) a--.

COLUMN 21 :

Line 20, "for" should read --for,--.

Signed and Sealed this

Twenty-third Day of April, 1996

Attest:

BRUCE LEHMAN

Attesting Officer     Commissioner of Patents and Trademarks